US012689090B2

(12) United States Patent
Zhou et al.

(10) Patent No.: US 12,689,090 B2
(45) Date of Patent: Jul. 21, 2026

(54) PRESSURE RELIEF APPARATUS, BATTERY CELL, BATTERY, AND ELECTRICAL DEVICE

(71) Applicant: CONTEMPORARY AMPEREX TECHNOLOGY (HONG KONG) LIMITED, Hong Kong (CN)

(72) Inventors: Wenlin Zhou, Ningde (CN); Kaihuan Yang, Ningde (CN); Ting Zheng, Ningde (CN); Quankun Li, Ningde (CN); Peng Wang, Ningde (CN); Mingguang Gu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 213 days.

(21) Appl. No.: 18/333,167

(22) Filed: Jun. 12, 2023

(65) Prior Publication Data

US 2023/0327275 A1    Oct. 12, 2023

Related U.S. Application Data

(63) Continuation of application No. PCT/CN2022/116298, filed on Aug. 31, 2022.

(30) Foreign Application Priority Data

Aug. 31, 2021    (WO) ................ PCT/CN2021/115766

(51) Int. Cl.
*H01M 50/342*    (2021.01)
*F16K 17/40*    (2006.01)
(Continued)

(52) U.S. Cl.
CPC ....... *H01M 50/3425* (2021.01); *F16K 17/403* (2013.01); *H01M 50/147* (2021.01); (Continued)

(58) Field of Classification Search
CPC ........... H01M 50/3425; H01M 50/249; H01M 50/15; H01M 50/147; H01M 2200/20; H01M 2220/20; F16K 17/403
See application file for complete search history.

(56) References Cited

U.S. PATENT DOCUMENTS

2012/0021259 A1* 1/2012 Kim .................... H01M 50/325
                                                                           429/53
2018/0175333 A1* 6/2018 Sodeyama ............ B60L 3/0046
(Continued)

FOREIGN PATENT DOCUMENTS

CN        107004805 A      8/2017
CN        207134411 U      3/2018
(Continued)

OTHER PUBLICATIONS

EPO machine generated English translation of JP-2000182591-A (Year: 2000).*

(Continued)

*Primary Examiner* — Kimberly Wyluda
(74) *Attorney, Agent, or Firm* — ANOVA LAW GROUP, PLLC

(57) ABSTRACT

A pressure relief apparatus includes a pressure relief part having a first surface and a second surface opposite to each other in a thickness direction of the pressure relief part, and a plurality of stages of score grooves sequentially arranged on the pressure relief part in a direction from the first surface to the second surface. Of two adjacent stages of score grooves in the thickness direction, one stage of score groove that is farther from the first surface is arranged on a bottom surface of another stage of score groove that is closer to the first surface.

20 Claims, 10 Drawing Sheets

(51) Int. Cl.
　　*H01M 50/147*　　　(2021.01)
　　*H01M 50/15*　　　(2021.01)
　　*H01M 50/249*　　　(2021.01)

(52) U.S. Cl.
　　CPC ......... *H01M 50/15* (2021.01); *H01M 50/249*
　　　　(2021.01); *H01M 2200/20* (2013.01); *H01M*
　　　　　　　　　　　　　　*2220/20* (2013.01)

(56)　　　　　References Cited

U.S. PATENT DOCUMENTS

| 2019/0260069 | A1* | 8/2019 | Shin | .................... | H01M 50/103 |
|---|---|---|---|---|---|
| 2020/0091551 | A1* | 3/2020 | Sodeyama | ............ | H01M 50/30 |
| 2020/0328399 | A1 | 10/2020 | Jiang et al. | | |
| 2021/0175577 | A1 | 6/2021 | Shiotani et al. | | |
| 2021/0249720 | A1* | 8/2021 | Chen | ...................... | H01G 11/14 |
| 2021/0296625 | A1* | 9/2021 | Li | ........................ | H01M 50/124 |

FOREIGN PATENT DOCUMENTS

| CN | 111033790 | A | | 4/2020 | | |
|---|---|---|---|---|---|---|
| CN | 111446388 | A | | 7/2020 | | |
| CN | 212136523 | U | | 12/2020 | | |
| CN | 212461953 | U | | 2/2021 | | |
| CN | 213340640 | U | | 6/2021 | | |
| CN | 213546511 | U | | 6/2021 | | |
| CN | 215989101 | U | | 3/2022 | | |
| CN | 215989102 | U | | 3/2022 | | |
| CN | 114447514 | A | | 5/2022 | | |
| CN | 217182358 | U | | 8/2022 | | |
| CN | 218414924 | U | | 1/2023 | | |
| EP | 2328207 | A1 | | 6/2011 | | |
| EP | 2328207 | B1 | | 9/2015 | | |
| HK | 1211676 | A1 | | 5/2016 | | |
| JP | S61143936 | U | | 9/1986 | | |
| JP | H01309252 | A | * | 12/1989 | .......... | H01M 2/1241 |
| JP | H11204093 | A | | 7/1999 | | |
| JP | 2000182591 | A | * | 6/2000 | | |
| JP | 2000285892 | A | | 10/2000 | | |
| JP | 2000348700 | A | | 12/2000 | | |
| JP | 2004178820 | A | | 6/2004 | | |
| JP | 2005038709 | A | | 2/2005 | | |
| JP | 2006351234 | A | | 12/2006 | | |
| JP | 2009004271 | A | | 1/2009 | | |
| JP | 2010049883 | A | | 3/2010 | | |
| JP | 2010165590 | A | | 7/2010 | | |
| JP | 2014049398 | A | | 3/2014 | | |
| JP | 2014102935 | A | | 6/2014 | | |
| JP | 2014116220 | A | | 6/2014 | | |
| JP | 2015069716 | A | | 4/2015 | | |
| JP | 5876794 | B2 | | 3/2016 | | |
| JP | 2016157570 | A | | 9/2016 | | |
| JP | 2016189248 | A | | 11/2016 | | |
| JP | 3227978 | U | | 10/2020 | | |
| WO | 2019039422 | A1 | | 2/2019 | | |
| WO | 2021120043 | A1 | | 6/2021 | | |

OTHER PUBLICATIONS

EPO machine generated English translation of JP 2016-157570 A (Year: 2016).*
EPO machine generated English translation of JP 2015-069716A (Year: 2015).*
EPO machine generated English translation of JP-H01309252-A (Year: 1989).*
Canadian Intellectual Property Office Office Action for Application No. 3183528 Jun. 12, 2024 4 Pages.
State Intellectual Property Office of China Notice of Grant of Utility Model Patent Rights for Application No. 202122087757.6 Jan. 6, 2022 2 pages (including translation).
The European Patent Office (EPO) The Extended European Search Report for 21948694.1 Apr. 15, 2024 8 Pages.

The Japan Patent Office (JPO) Decision to Grant a Patent for Application No. 2023-502626 Jun. 4, 2024 6 Pages(including translation).
The Japan Patent Office (JPO) Notification of Reasons for Refusal for Application No. 2023-502626 Feb. 27, 2024 9 Pages(including translation).
The World Intellectual Property Organization (WIPO) Written Opinion for PCT/CN2021/115766 May 7, 2022 7 Pages (including translation).
State Intellectual Property Office of China Notice of Grant of Utility Model Patent Rights for Application No. 202222314334.9 Nov. 18, 2022 2 pages (including translation).
The Japan Patent Office (JPO) Notification of Reasons for Refusal for Application No. 2023-528257 Jun. 4, 2024 12 Pages(including translation).
The World Intellectual Property Organization (WIPO) Written Opinion for PCT/CN2022/116298 Nov. 10, 2022 11 Pages (including translation).
State Intellectual Property Office of China Notice of Grant of Utility Model Patent Rights for Application No. 202222326423.5 Jan. 6, 2023 2 pages (including translation).
The Japan Patent Office (JPO) Notification of Reasons for Refusal for Application No. 2023-530006 Jun. 11, 2024 7 Pages(including translation).
The World Intellectual Property Organization (WIPO) Written Opinion for PCT/CN2022/116275 Nov. 10, 2022 11 Pages (including translation).
State Intellectual Property Office of China Notice of Grant of Utility Model Patent Rights for Application No. 202222314407.4 Nov. 18, 2022 2 pages (including translation).
The Japan Patent Office (JPO) Notification of Reasons for Refusal for Application No. 2023-530008 May 28, 2024 12 Pages(including translation).
The World Intellectual Property Organization (WIPO) Written Opinion for PCT/CN2022/116299 Nov. 9, 2022 11 Pages (including translation).
The Japan Patent Office (JPO). Decision to Grant a Patent for Application No. 2023-528257 Dec. 10, 2024. 6 Pages (including translation).
The World Intellectual Property Organization (WIPO) International Search Report for PCT/CN2021/115766 May 7, 2022 5 pages (including English translation).
The World Intellectual Property Organization (WIPO) International Search Report for PCT/CN2022/116275 Nov. 10, 2022 5 pages (including English translation).
The World Intellectual Property Organization (WIPO) International Search Report for PCT/CN2022/116298 Nov. 10, 2022 5 pages (including English translation).
The World Intellectual Property Organization (WIPO) International Search Report for PCT/CN2022/116299 Nov. 9, 2022 6 pages (including English translation).
The European Patent Office (EPO) The Extended European Search Report for Application No. 22863539.7 Jan. 17, 2025 9 Pages.
The European Patent Office (EPO) The Extended European Search Report for Application No. 22863534.8 Jan. 28, 2025 10 Pages.
The European Patent Office (EPO) The Extended European Search Report for Application No. 22863540.5 Jan. 17, 2025 10 Pages.
State Intellectual Property Office of China Notice of First Examination Opinion for Application No. 202280005459.3 Jun. 18, 2024 10 pages (including translation).
The Japan Patent Office (JPO) Notice of Reasons for Refusal for Application No. 2023-530006 Jan. 7, 2025 6 Pages (including translation).
The European Patent Office (EPO) Intention to Grant for Application No. 21948694.1 Oct. 23, 2024 5 Pages.
Korean Intellectual Property Office (KIPO) Office Action 1 for Application No. 10-2023-7003696 Oct. 30, 2024 17 Pages (including translation).
The Japan Patent Office (JPO) Notice of Reasons for Refusal for Application No. 2023-528257 Dec. 10, 2024 6 Pages (including translation).
Korean Intellectual Property Office (KIPO) Office Action 1 for Application No. 10-2023-7015526 Nov. 27, 2024 16 Pages (including translation).

(56)           References Cited

OTHER PUBLICATIONS

Korean Intellectual Property Office (KIPO) Office Action 1 for Application No. 10-2023-7016596 Nov. 27, 2024 14 Pages (including translation).
Korean Intellectual Property Office (KIPO) Office Action 1 for Application No. 10-2023-7016558 Nov. 27, 2024 16 Pages (including translation).
The Japan Patent Office (JPO) Decision to Grant a Patent for Application No. 2023-530008 Oct. 29, 2024 5 Pages (including translation).
State Intellectual Property Office of China Notice of Grant of Invention Patent Right for Application No. 202280005459.3 Dec. 11, 2024 2 pages (including translation).
The Japan Patent Office (JPO) Notice of Reasons for Refusal for Application No. 2023-530006 Jan. 7, 2025 7 Pages (including translation).
The Japan Patent Office (JPO) Decision to Grant for Application No. 2023-528257 Dec. 10, 2024 6 Pages (including translation).
The European Patent Office (EPO) Communication pursuant to Article 94(3) EPC for Application No. 22863540.5 Oct. 01, 2025 6 Pages.
The European Patent Office (EPO) Communication under Rule 71(3) EPC for Application No. 22863539.7 Oct. 27, 2025 57 Pages.
State Intellectual Property Office of China Notification of Grant of Invention Patent for Application No. 202180066181.6 Nov. 18, 2025 6 pages (including translation).
United States Patent and Trademark Office (USPTO) Non-Final Office Action for U.S. Appl. No. 18/187,207, filed Sep. 24, 2025 46 Pages.
Indian Patent Office Examination report for Application No. 202327018180 Dec. 15, 2025 5 pages.
Republic of Indonesia Directorate General of Intellectual Property Notification of Initial Substantive Examination Results for Application No. P00202302115 Nov. 20, 2025 7 pages (including translation).
State Intellectual Property Office of China Notice of Grant of Invention Patent Right for Application No. 202180066181.6 Nov. 18, 2025 7 pages (including translation).
United States Patent and Trademark Office (USPTO) Non-final Rejection for U.S. Appl. No. 18/413,080, filed Jan. 23, 2026 84 Pages.
Korean Intellectual Property Office (KIPO) Notice of allowance for Application No. 10-2023-7003696 Feb. 24, 2026 4 Pages (including translation).

* cited by examiner

25

PRESSURE RELIEF APPARATUS, BATTERY CELL, BATTERY, AND ELECTRICAL DEVICE

CROSS-REFERENCE TO RELATED APPLICATIONS

The present application is a continuation of International Application No. PCT/CN2022/116298, filed on Aug. 31, 2022, which claims priority to International Application No. PCT/CN2021/115766 entitled "pressure relief apparatus, battery cell, battery, and electrical device" and filed on Aug. 31, 2021, the entire contents of both of which are incorporated herein by reference.

TECHNICAL FIELD

The present application relates to the technical field of batteries, and specifically, to a pressure relief apparatus, a battery cell, a battery, and an electrical device.

BACKGROUND

Batteries are widely used in electronic devices such as mobile phones, laptops, battery vehicles, electric vehicles, electric planes, electric ships, electric toy cars, electric toy ships, electric toy planes and electric tools, and so on.

In the battery technology, in order to ensure the safety of a battery cell, a pressure relief apparatus is generally arranged in the battery cell. When the internal pressure or temperature of the battery cell reaches a threshold value, the pressure relief apparatus breaks at the position where score grooves are arranged, so as to relieve the pressure inside the battery cell. For a general pressure relief apparatus, pressure relief may occur even when the internal pressure of the battery cell is within the normal range, leading to a poor long-term reliability.

SUMMARY

Embodiments of the present application provide a pressure relief apparatus, a battery cell, a battery, and an electrical device, which can effectively improve the long-term reliability of the pressure relief apparatus.

In the first aspect, an embodiment of the present application provides a pressure relief apparatus comprising a pressure relief part and multi-stage score grooves, wherein the pressure relief part has a first surface and a second surface in a thickness direction thereof that are opposite to each other; and the multi-stage score grooves are sequentially arranged on the pressure relief part in a direction from the first surface to the second surface, wherein among two adjacent stages of score grooves in the thickness direction, the stage of score groove far from the first surface is arranged on the bottom surface of the stage of score groove near the first surface.

In the above technical solution, multi-stage score grooves are arranged on the pressure relief part, wherein the multi-stage score grooves are sequentially arranged on the pressure relief part in the direction from the first surface to the second surface of the pressure relief part, and one stage of score groove far from the first surface is arranged on the bottom surface of one stage of score groove near the first surface. The pressure relief apparatus with this structure adopts the structure of multi-stage score grooves, which can reduce the forming depth of each stage of score groove, thereby reducing the forming force applied to the pressure relief part when each stage of score groove is formed, reducing the risk of cracks generated on the pressure relief part, so that the pressure relief apparatus is not easy to fail due to cracks generated on the pressure relief part at the position where the score grooves are arranged, thus improving the long-term reliability of the pressure relief apparatus.

In some embodiments, wherein the multi-stage score grooves comprise at least one stage of first-stage score groove, the first-stage score groove comprising a first groove segment, a second groove segment, and a third groove segment, with the first groove segment and the second groove segment being oppositely arranged, and the first groove segment and the second groove segment both intersecting with the third groove segment; and the pressure relief part comprises an opening region, with the first groove segment, the second groove segment, and the third groove segment being arranged along the edge of the opening region, and the opening region being configured to be openable with the first groove segment, the second groove segment, and the third groove segment as the boundary. In this way, the opening region is openable with the first groove segment, the second groove segment, and the third groove segment as the boundary, thus increasing the pressure relief area of the pressure relief part and increasing the pressure relief rate of the pressure relief part.

In some embodiments, the first-stage score groove further comprises a fourth groove segment, with the fourth groove segment being located between the first groove segment and the second groove segment, and the fourth groove segment intersecting with the third groove segment. The stress of the pressure relief part at the position of intersection of the third groove segment with the fourth groove segment is more concentrated, and it is easier to break, so that the pressure relief part breaks along the third groove segment from the position of intersection of the third groove segment with the fourth groove segment during the pressure relief process, and then breaks along the first groove segment and the second groove segment after the third groove segment breaks, so as to realize rapid pressure relief.

In some embodiments, in the direction of extension of the third groove segment, the distance from the position of intersection of the fourth groove segment with the third groove segment to the first groove segment is equal to the distance from the position of intersection of the fourth groove segment with the third groove segment to the second groove segment. In this way, the pressure relief part can break along the first groove segment and the second groove segment synchronously after breaking along the third groove segment at the position of intersection of the fourth groove segment with the third groove segment, so that the opening region can be opened more quickly.

In some embodiments, the first groove segment, the second groove segment, and the third groove segment define at least one said opening region. The opening region is defined jointly by the first groove segment, the second groove segment, and the third groove segment, and the opening region can be opened in a flipping manner, and the opening region is always connected to other regions of the pressure relief part after being opened, so that it is not easy to fall off, thus reducing the risk of splashing after the opening region is opened.

In some embodiments, the first groove segment, the second groove segment, and the third groove segment define two said opening regions, the two opening regions being located on two sides of the third groove segment, respectively. The portions of the pressure relief part that are in the two opening regions can be opened in a counter-opening manner during the pressure relief process of the pressure relief part, which increases the pressure relief area and can thus effectively improve the pressure relief rate of the pressure relief part.

In some embodiments, the second surface is provided with a notch groove located in the opening region, and the notch groove is at a distance from the third groove segment in the direction of extension of the first groove segment. In this way, in the pressure relief process of the pressure relief part, a portion of the pressure relief part in the opening region can be turned over by taking the position of the pressure relief part at the notch groove as an axis, and is easier to open for pressure relief.

In some embodiments, the multi-stage score grooves comprise one stage of first-stage score groove. The multi-stage score grooves have only one stage of first-stage score groove, which is simple to mold, thus improving the production efficiency and facilitating reduction in production costs.

In some embodiments, the multi-stage score grooves comprise multiple stages of first-stage score grooves sequentially arranged in the direction from the first surface to the second surface. The multiple stages of first-stage score grooves are sequentially arranged in the direction from the first surface to the second surface, so that the forming depth of each stage of first-stage score groove can be reduced, thereby reducing the forming force applied to the pressure relief part when forming each stage of first-stage score groove, and reducing the risk of cracks generated on the pressure relief part. In the process of machining the first-stage score grooves stage by stage in the direction from the first surface to the second surface, the hardness of the residual portion of the pressure relief part at the position where the first-stage score grooves are arranged will increase with each machining of one stage of first-stage score groove, so that the hardness of the residual portion of the pressure relief part after the multiple stages of first-stage score grooves have been arranged is improved, resulting in better long-term reliability, better impact resistance, and a lower probability of damage by external force impact.

In some embodiments, the outermost stage of first-stage score groove is arranged on the first surface. The outermost stage of first-stage score groove can be formed directly on the first surface, which simplifies the structure of the pressure relief apparatus and reduces the production cost.

In some embodiments, the multi-stage score grooves comprise two stages of first-stage score grooves.

In some embodiments, the multi-stage score grooves further comprise at least one stage of second-stage score groove, the at least one stage of second-stage score groove and the at least one stage of first-stage score groove being sequentially arranged in the direction from the first surface to the second surface, wherein the opening region is formed on the groove bottom wall of one stage of second-stage score groove that is farthest from the first surface. During forming, the second-stage score groove can be formed on the pressure relief part first, so that the pressure relief part is overall thinned in the region where the second-stage score groove is arranged and the hardness of the residual portion in this region is increased; then, the first-stage score groove is formed on the pressure relief part, so that the hardness of the pressure relief part in the residual portion at the position of the first-stage score groove is further increased, resulting in better long-term reliability, better impact resistance, and a lower probability of damage by external force impact. In addition, since the opening region is formed on the groove bottom wall of the stage of second-stage score groove farthest from the first surface, the second-stage score groove can provide an avoidance space for the opening region in the opening process, and the opening region can still be opened for pressure relief even if the first surface is blocked by an obstacle.

In some embodiments, the multi-stage score grooves comprise one stage of said second-stage score groove, the second-stage score groove being arranged on the first surface. The pressure relief part is arranged with one stage of second-stage score groove, which is simple to mold, thus improving the production efficiency and reducing production costs.

In some embodiments, the multi-stage score grooves comprise multiple stages of said second-stage score grooves, the multiple stages of said second-stage score grooves being sequentially arranged in the direction from the first surface to the second surface, with the outermost stage of second-stage score groove being arranged on the first surface. The pressure relief part is arranged with multiple stages of second-stage score grooves, so that the forming depth of each stage of second-stage score groove is relatively shallow, which can reduce the forming force applied to the pressure relief part during forming of each stage of second-stage score groove and reduce the risk of cracks generated on the pressure relief part. When machining the multiple stages of second-stage score grooves stage by stage in the direction from the first surface to the second surface, the hardness of the residual portion of the pressure relief part in the region where the second-stage score grooves are arranged will increase with each machining of one stage of second-stage score groove, so that the hardness of the residual portion of the pressure relief part in the region of the first-stage score grooves is further improved.

In some embodiments, the second-stage score groove is a circular groove or a rectangular groove. The second-stage score groove has a simple structure and is thus easy to mold, which can provide more avoidance space for the opening of the opening region.

In some embodiments, each stage of said score grooves comprises at least one groove segment, and among two adjacent groove segments in the thickness direction, a maximum width of the groove segment far from the first surface is less than a minimum width of the groove segment near the first surface. During forming, groove segments of each grade of score groove can be formed sequentially in the direction from the first surface to the second surface to facilitate the forming of the groove segments of each grade of score groove.

In some embodiments, the distance between the first surface and the second surface is $H_0$, and the distance from the bottom surface of one stage of score groove that is nearest to the second surface to the second surface is $H_1$, which satisfy the following condition: $H_1/H_0 < 0.2$. In this way, the residual thickness of the pressure relief part in the region where the stage of score groove nearest to the second surface is arranged accounts for a small proportion of the total thickness of the pressure relief part, so that the portion between the bottom surface of the stage of score groove nearest to the second surface and the second surface can break normally to realize pressure relief.

In some embodiments, the distance from the bottom surface of the stage of score groove nearest to the second surface to the second surface is $H_1$, which satisfies the following condition: $H_1 < 0.5$ mm, so that the pressure relief part has a smaller residual thickness in the region where the stage of score groove nearest to the second surface is arranged and is thus easy to break for pressure relief.

In some embodiments, a depth of the stage of score groove that is arranged on the first surface is $H_2$, which satisfies the following condition: $H_2 < 1$ mm, so that the depth of the outermost stage of score groove of the pressure relief part is small, thus reducing the forming force applied to the pressure relief part at that stage of score groove during the forming process and reducing the risk of cracks generated on the pressure relief part.

In some embodiments, a depth of each stage of score groove between the stage of score groove nearest to the second surface and the stage of score groove arranged on the first surface is $H_3$, which satisfies the following condition: $H_3 < 1.5$ mm, so that the depth of each stage of score groove on the pressure relief part other than the stage of score groove nearest to the second surface and the stage of score groove arranged on the first surface is small, thus reducing the forming force applied to the pressure relief part during the forming process and reducing the risk of cracks generated on the pressure relief part.

In some embodiments, only one stage of score groove is arranged between the stage of score groove nearest to the second surface and the stage of score groove arranged on the first surface. In this way, three stages of score grooves are arranged on the pressure relief part, so that the structure is simple, which can reduce the forming depth of each stage of score groove and reduce the risk of cracks generated on the pressure relief part.

In some embodiments, the pressure relief apparatus has an accommodating space formed inside, and the pressure relief apparatus has multiple wall portions defining the accommodating space, the accommodating space being used to house an electrode assembly, and at least one of the multiple wall portions being provided with the pressure relief part. The pressure relief apparatus of such a structure has both an accommodating function to accommodate the electrode assembly and a pressure relief function.

In some embodiments, the multiple wall portions comprise a peripheral wall and a bottom wall, the peripheral wall being arranged around the edge of the bottom wall, the peripheral wall and the bottom wall jointly defining the accommodating space, an opening being formed at one end of the peripheral wall opposite to the bottom wall, and the bottom wall being provided with the pressure relief part. In this way, the bottom wall of the pressure relief apparatus has a pressure relief function, thus facilitating relief of the pressure inside the accommodating space.

In some embodiments, the peripheral wall and the bottom wall are of an integrally formed structure. Since the bottom wall is formed with the pressure relief part and the peripheral wall and the bottom wall are of an integrally formed structure, the peripheral wall as well as the bottom wall that has the pressure relief function have good firmness, and this integral design can simplify the forming process and reduce production costs.

In some embodiments, the first surface is an outer surface of the bottom wall. In this way, score grooves can be machined and formed on the outer side of the bottom wall, thus facilitating machining of score grooves on the bottom wall.

In some embodiments, the pressure relief part is an end cover, which end cover is used to cover an opening of a case, so that the end cover has a pressure relief function, and by providing score grooves on the end cover, a pressure relief structure is formed, which pressure relief structure has better stability and good long-term reliability.

In some embodiments, the first surface is a surface of the end cover facing away from the case.

In a second aspect, an embodiment of the present application provides a battery cell comprising the pressure relief apparatus provided in any one of the embodiments of the first aspect.

In a third aspect, an embodiment of the present application provides a battery comprising the battery cell provided in any one of the embodiments of the second aspect.

In a fourth aspect, an embodiment of the present application provides an electrical device comprising the battery provided in any one of the embodiments of the third aspect.

DESCRIPTION OF DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
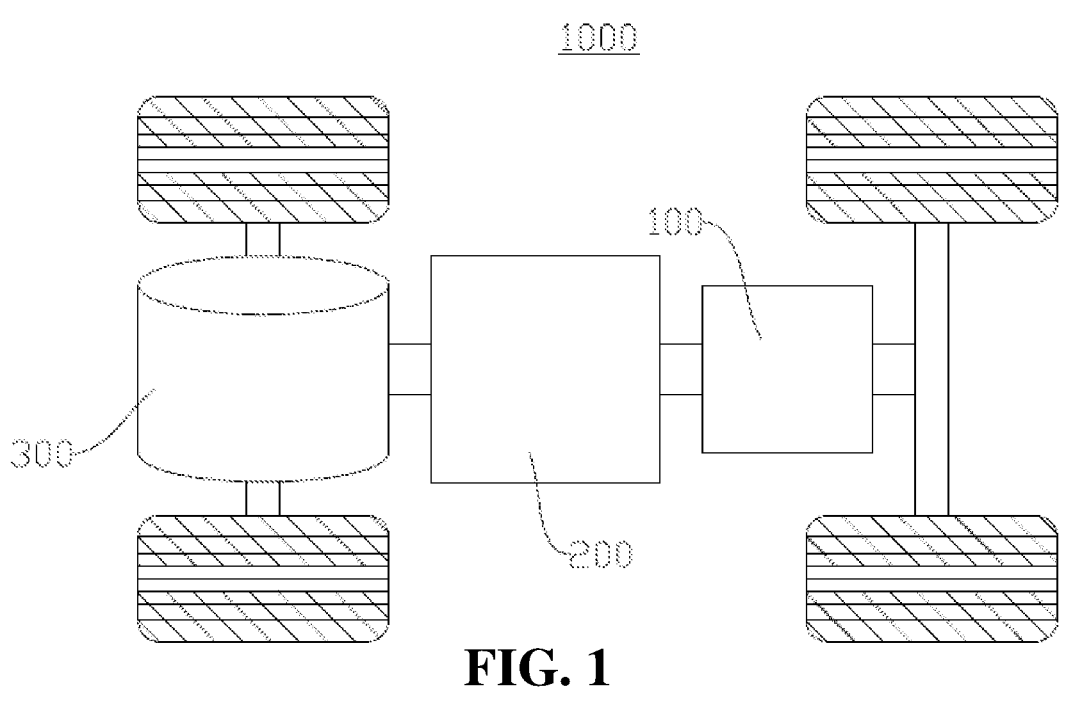
FIG. 1 is a schematic structural view of a vehicle provided by some embodiments of the present application.

Reference numerals: 10—box body; 11—first portion; 12—second portion; 20—battery cell; 21—case; 22—electrode assembly; 221—positive electrode tab; 222—negative electrode tab; 23—end cover; 231—positive electrode terminal; 232—negative electrode terminal; 24—insulating member; 25—pressure relief apparatus; 251—pressure relief part; 2511—first surface; 2512—second surface; 2513—opening region; 252—score groove; 252a—first-stage score groove; 252b—second-stage score groove; 2521—first groove segment; 2522—second groove segment; 2523—third groove segment; 2524—fourth groove segment; 2525—groove bottom wall; 253—notch groove; 254—peripheral wall; 255—bottom wall; 26—current collecting member; 100—battery; 200—controller; 300—motor; 1000—vehicle; Z—thickness direction.

DETAILED DESCRIPTION

To make the objective, technical solutions and advantages of the embodiments of the present application more clear, the technical solutions in the embodiments of the present application will be clearly described below with reference to the drawings in the embodiments of the present application. Obviously, the embodiments described are some of rather than all of the embodiments of the present application. Based on the embodiments in the present application, all other embodiments obtained by those of ordinary skill in the art without creative effort fall within the protection scope of the present application.

Unless otherwise defined, all technical and scientific terms used in the present application have the same meanings as those commonly understood by those skilled in the art to which the present application belongs. The terms used in the specification of the present application are merely for the purpose of describing specific embodiments, but are not intended to limit the present application. The terms "comprising" and "having" and any variations thereof in the specification and the claims of the present application as well as the foregoing description of the drawings are intended to cover non-exclusive inclusions. The terms "first", "second", etc., in the specification and claims of the present application or in the accompanying drawings above are used to distinguish between different objects and are not intended to describe a particular order or relationship of precedence.

Reference to "an embodiment" in the present application means that a particular feature, structure, or characteristic described in connection with the embodiment can be included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting", "connecting", "connection" and "attachment" should be understood in a broad sense, unless otherwise explicitly specified or defined. For example, it may be a fixed connection, a detachable connection, or an integrated connection; and it may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relationship for describing associated objects, indicating that three relationships may exist. For example, A and/or B may represent three situations: A exists alone, both A and B exist, and B exists alone. In addition, the character "/" in the present application generally means that the associated objects before and after it are in an "or" relationship.

In the embodiments of the present application, the same reference numerals indicate the same parts and, for the sake of brevity, the detailed description of the same parts is omitted in the different embodiments. It should be understood that the dimensions such as the thickness, length, and width of various components in the embodiments of the present application shown in the accompanying drawings, as well as the dimensions such as the overall thickness, length, and width of the integrated apparatus are illustrative only and shall not constitute any limitation on the present application.

The term "multiple" as used in the present application refers to more than two (including two).

In the present application, the battery cell may comprise a lithium-ion secondary battery, a lithium-ion primary battery, a lithium-sulfur battery, a sodium/lithium-ion battery, a sodium-ion battery, a magnesium-ion battery, or the like, which is not limited in the embodiments of the present application. The battery cell may be cylindrical, flat, rectangular, or in other shapes, which is also not limited in the embodiments of the present application. Battery cells are generally divided into three types according to encapsulating manners: cylindrical battery cells, rectangular battery cells, and pouch cells, which are not limited in the embodiments of the present application.

The battery mentioned in the embodiments of the present application refers to a single physical module comprising one or more battery cells to provide a higher voltage and capacity. For example, the battery mentioned in the present application may comprise a battery module, a battery pack, or the like. The battery generally comprises a box body for encapsulating one or more battery cells. The box body can prevent liquids or other foreign matters from affecting the charging or discharging of the battery cells.

The battery cell comprises an electrode assembly and an electrolyte solution, the electrode assembly being composed of a positive electrode sheet, a negative electrode sheet, and a separator. The battery cell operates mainly relying on movement of metal ions between the positive electrode sheet and the negative electrode sheet. The positive electrode sheet comprises a positive electrode current collector and a positive electrode active material layer, wherein the positive electrode active material layer is coated on a surface of the positive electrode current collector, the part of the positive electrode current collector not coated with the positive electrode active material layer protrudes from the part of the positive electrode current collector already coated with the positive electrode active material layer, and the part of the positive electrode current collector not coated with the positive electrode active material layer serves as a positive electrode tab. Taking a lithium-ion battery as an example, the material of the positive electrode current collector may be aluminum, and the positive electrode active material may be lithium cobalt oxide, lithium iron phosphate, ternary lithium, lithium manganate, or the like. The negative electrode sheet comprises a negative electrode current collector and a negative electrode active material layer, wherein the negative electrode active material layer is coated on a surface of the negative electrode current collector, the part of the negative electrode current collector not coated with the negative electrode active material layer protrudes from the part of the negative electrode current collector already coated with the negative electrode active material layer, and the part of the negative electrode current collector not coated with the negative electrode active material layer serves as a negative electrode tab. The material of the negative electrode current collector may be copper, and the negative electrode active material may be carbon, silicon, or the like. In order to ensure that no fusing occurs when a large current passes, there are multiple positive electrode tabs which are stacked together, and there are multiple negative electrode tabs which are stacked together. A separator may be made from polypropylene (PP), polyethylene (PE), or the like. In addition, the electrode assembly may be of a wound structure or a laminated structure, which is not limited in the embodiments of the present application.

Many design factors, such as energy density, cycle life, discharge capacity, charge-discharge rate and other performance parameters, should be considered in the development of the battery technology. In addition, the safety of the battery also needs to be taken into account.

A pressure relief apparatus on the battery cell has an important impact on the safety of the battery. For example, when a short circuit, overcharge, or the like occurs, it may cause thermal runaway inside the battery cell, resulting in a sudden rise in pressure or temperature. In this case, internal pressure and temperature can be relieved outward through the actuation of the pressure relief mechanism to prevent explosion and fire of the battery cell.

The inventor found that in a general battery cell, the pressure relief apparatus may release pressure even when the internal pressure of the battery cell is within the normal range, resulting in the failure of the battery cell. The inventor further found through research that the pressure relief apparatus is generally arranged with score grooves on the pressure relief part, and in order to ensure that the pressure relief apparatus can normally release pressure when the internal pressure or temperature of the battery cell reaches a threshold value, it is necessary to machine the score grooves deeper, so that, after the score grooves on the pressure relief part are formed, cracks are easy to be produced, and the situation that the pressure relief apparatus releases pressure when the internal pressure of the battery cell is within the normal range (not reaching the threshold value) occurs.

In view of this, embodiments of the present application provide a pressure relief apparatus, wherein multi-stage score grooves are sequentially arranged on a pressure relief part of the pressure relief apparatus in the direction from the first surface to the second surface, and among two adjacent stages of score grooves in the thickness direction, the stage of score groove far from the first surface is arranged on the bottom surface of the stage of score groove near the first surface.

In such a pressure relief apparatus, the structure of multi-stage score grooves is adopted, which can reduce the forming depth of each stage of score groove, thereby reducing the forming force applied to the pressure relief part when each stage of score groove is formed, reducing the risk of cracks generated on the pressure relief part, so that the pressure relief apparatus is not easy to fail due to cracks generated on the pressure relief part at the position where the score grooves are arranged, thus improving the long-term reliability of the pressure relief apparatus.

The pressure relief apparatus described in the embodiments of the present application is applicable to batteries and electrical devices using batteries.

The electrical device may be, but not limited to, a vehicle, a mobile phone, a portable device, a laptop computer, a ship, a spacecraft, an electric toy, an electric tool, and the like. The vehicle may be a fuel vehicle, a gas vehicle or a new energy vehicle. The new energy vehicle may be an all-electric vehicle, a hybrid electric vehicle, an extended-range electric vehicle, or the like. The spacecraft comprises airplanes, rockets, space shuttles, spaceships, and the like. The electric toy comprises fixed or mobile electric toys, such as game consoles, electric car toys, electric ship toys and electric aircraft toys. The electric tool comprises metal cutting electric tools, grinding electric tools, assembly electric tools and railway electric tools, such as electric drills, electric grinders, electric wrenches, electric screwdrivers, electric hammers, impact drills, concrete vibrators and electric planers. The embodiments of the present application do not impose special limitations on the above electrical device.

For the convenience of illustration, the following embodiments are illustrated using an example in which the electrical device is a vehicle.

Please refer to FIG. 1. FIG. 1 is a schematic structural diagram of a vehicle 1000 according to some embodiments of the present application. The interior of the vehicle 1000 is arranged with a battery 100, and the battery 100 may be arranged at the bottom or head or tail of the vehicle 1000. The battery 100 may be used to power the vehicle 1000. For example, the battery 100 may be used as an operating power source of the vehicle 1000.

The vehicle 1000 may further comprise a controller 200 and a motor 300, wherein the controller 200 is used to control the battery 100 to power the motor 300, for example, for the operating power demand when the vehicle 1000 is starting, navigating and driving.

In some embodiments of the present application, the battery 100 not only may serve as an operating power source of the vehicle 1000, but also may serve as a driving power source of the vehicle 1000, thus replacing or partially replacing fuel or natural gas to provide driving power for the vehicle 1000.

Figure 2:
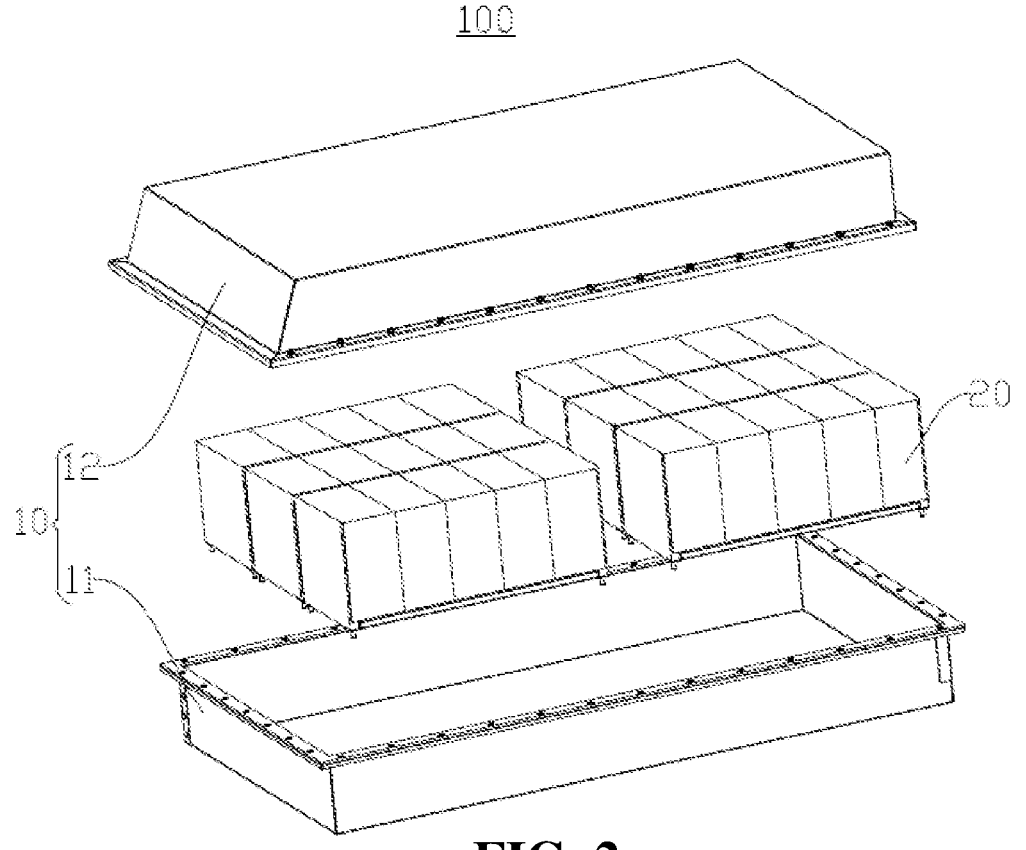
FIG. 2 is a schematic structural view of the battery provided by some embodiments of the present application.

Please refer to FIG. 2. FIG. 2 is a schematic structural diagram of a battery 100 provided by some embodiments of the present application. The battery 100 comprises a box body 10 and a battery cell 20, wherein the box body 10 is used to accommodate the battery cell 20.

Here, the box body 10 is a component for accommodating the battery cell 20, the box body 10 provides an accommodating space for the battery cell 20, and the box body 10 can be of a variety of structures. In some embodiments, the box body 10 may comprise a first portion 11 and a second portion 12, the first portion 11 and the second portion 12 covering each other to define an accommodating space for accommodating the battery cell 20. The first portion 11 and the second portion 12 may be of a variety of shapes, such as a rectangular solid, a cylinder, or the like. The first portion 11 may be a of hollow structure with one side open, the second portion 12 may also be of a hollow structure with one side open, and the opening side of the second portion 12 covers the opening side of the first portion 11, so as to form the box body 10 with an accommodating space. Alternatively, the first portion 11 may be of a hollow structure with one side open, the second portion 12 may be of a plate-like structure, and the second portion 12 covers the opening side of the first portion 11 to form the box body 10 with an accommodating space. The first portion 11 and the second portion 12 may be sealed by a sealing member, which may be a sealing ring, a sealant, or the like.

There may be one or more battery cell 20 in a battery 100. If there are multiple battery cells 20, the multiple battery cells 20 can be connected in series or parallel or in a mixed connection, wherein the parallel-series connection means that the multiple battery cells 20 are connected in both series and parallel. The multiple battery cells 20 may be connected in series or in parallel or in mixed connection to form a battery module first, then multiple battery modules are connected in series or in parallel or in parallel-series connection to form a whole, and accommodated in the box body 10. It may also be that all the battery cells 20 are directly connected in series or in parallel or in parallel-series connection, and then the whole composed of all the battery cells 20 is accommodated in the box body 10.

In some embodiments, the battery 100 may also comprise a confluence component, and multiple battery cells 20 may be electrically connected through the convergence component, so as to realize series, parallel or parallel-series connection of the multiple battery cells 20. The convergence component may be metal conductors such as copper, iron, aluminum, stainless steel, aluminum alloys, and the like.

Figure 3:
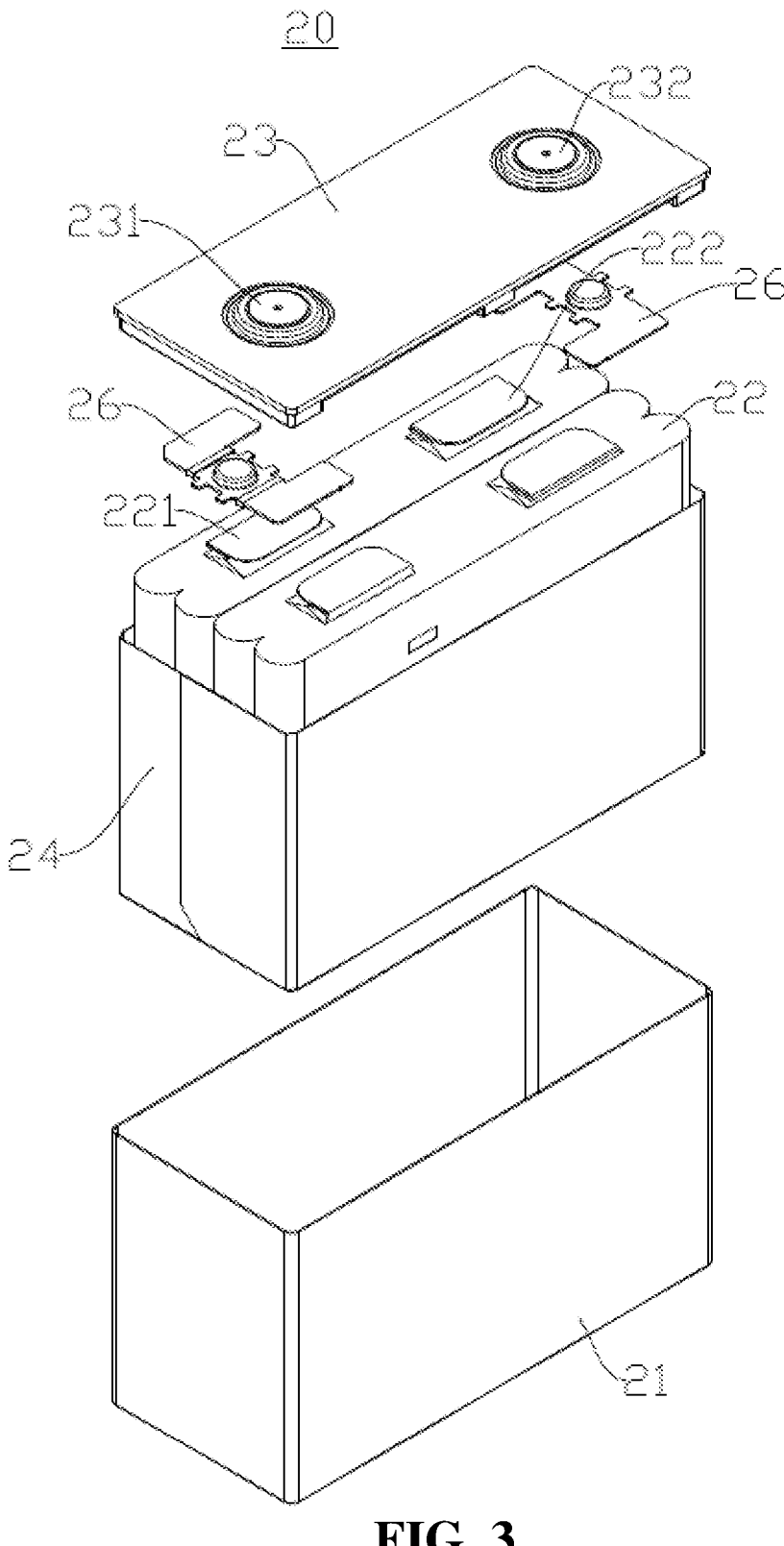
FIG. 3 is an exploded view of a battery cell provided by some embodiments of the present application.

Please refer to FIG. 3. FIG. 3 is an exploded view of a battery cell 20 according to some embodiments of the present application. The battery cell 20 comprises a case 21, an electrode assembly 22, an end cover 23, an insulating member 24, and a pressure relief apparatus 25 (not shown in FIG. 3).

The case 21 is a component for accommodating the electrode assembly 22, and the case 21 may be of a hollow structure with an opening formed at one end. The case 21 may be of a variety of shapes, such as a cylinder, a rectangular solid, or the like. The case 21 may be made of various materials, such as copper, iron, aluminum, stainless steel, aluminum alloy, or the like.

The number of electrode assemblies 22 within the case 21 may be one or more. For example, as shown in the drawing, there are multiple electrode assemblies 22, and the multiple electrode assemblies 22 are stacked in the case 21.

The electrode assembly 22 is a component in which an electrochemical reaction occurs in the battery cell 20. The electrode assembly 22 may comprise a positive electrode sheet, a negative electrode sheet, and a separator. The electrode assembly 22 may be a wound-type structure formed by winding a positive electrode sheet, a separator and a negative electrode sheet, or may be a stacked-type structure formed by stacking a positive electrode sheet, a separator, and a negative electrode sheet.

The positive electrode sheet may comprise a positive electrode current collector and a positive electrode active material layer coated on two opposite sides of the positive electrode current collector. The negative electrode sheet may comprise a negative electrode current collector and a negative electrode active material layer coated on two opposite sides of the negative electrode current collector. The electrode assembly 22 has a positive electrode tab 221 and a negative electrode tab 222, where the positive electrode tab 221 may be a portion of the positive electrode sheet on which the positive electrode active material layer is not coated, and the negative electrode tab 222 may be a portion of the negative electrode sheet on which the negative electrode active material layer is not coated.

The end cover 23 is a component that covers the opening of the case 21 to isolate the internal environment of the battery cell 20 from the external environment. The end cover 23 covers the opening of the case 21, and the end cover 23 and the case 21 jointly define a sealed space for accommodating the electrode assembly 22, electrolyte solution, and other components. The shape of the end cover 23 may be adapted to the shape of the case 21, for example, the case 21 is of a rectangular solid structure, and the end cover 23 is of a rectangular plate-like structure adapted to the case 21; for another example, the case 21 is of a cylindrical structure, and the end cover 23 is of a circular plate-like structure adapted to the case 21. The end cover 23 may also be made of various materials, for example, copper, iron, aluminum, steel, aluminum alloy, or the like, and the material of the end cover 23 and the material of the case 21 may be the same or different.

The end cover 23 may be arranged with electrode terminals that are used to electrically connect to the electrode assemblies 22 so as to output electrical energy from the battery cell 20. The electrode terminals may comprise a positive electrode terminal 231 and a negative electrode terminal 232, wherein the positive electrode terminal 231 is used to electrically connect to the positive electrode tab 221 and the negative electrode terminal 232 is used to electrically connect to the negative electrode tab 222. The positive electrode terminal 231 may be directly or indirectly connected to the positive electrode tab 221, and the negative electrode terminal 232 may be directly or indirectly connected to the negative electrode tab 222. As an example, the positive electrode terminal 231 is electrically connected to the positive electrode tab 221 via a current collecting member 26, and the negative electrode terminal 232 is electrically connected to the negative electrode tab 222 via another current collecting member 26.

An insulating member 24 is a component that separates the case 21 from the electrode assembly 22, and the insulation isolation of the case 21 from the electrode assembly 22 is achieved via the insulating member 24. The insulating member 24 is made of an insulating material, and the insulating member 24 may be made of an insulating material such as plastic, rubber, etc. As an example, the outer periphery of the electrode assembly 22 is circumferentially wrapped by the insulating member 24, and it can be understood that in the case where there are multiple electrode assemblies 22, the entire outer periphery of the multiple electrode assemblies 22 is circumferentially wrapped by the insulating member 24.

The pressure relief apparatus 25 is a component for releasing the pressure inside the battery cell 20, and the pressure inside the battery cell 20 is released through the pressure relief apparatus 25 when the pressure or temperature inside the battery cell 20 reaches a threshold value. The pressure relief apparatus 25 may be a component arranged on the end cover 23, or the case 21 may serve as the pressure relief apparatus 25, or, alternatively, the end cover 23 serves as the pressure relief apparatus 25. The specific structure of the pressure relief apparatus 25 is described in detail below in conjunction with the accompanying drawings.

Figure 4:
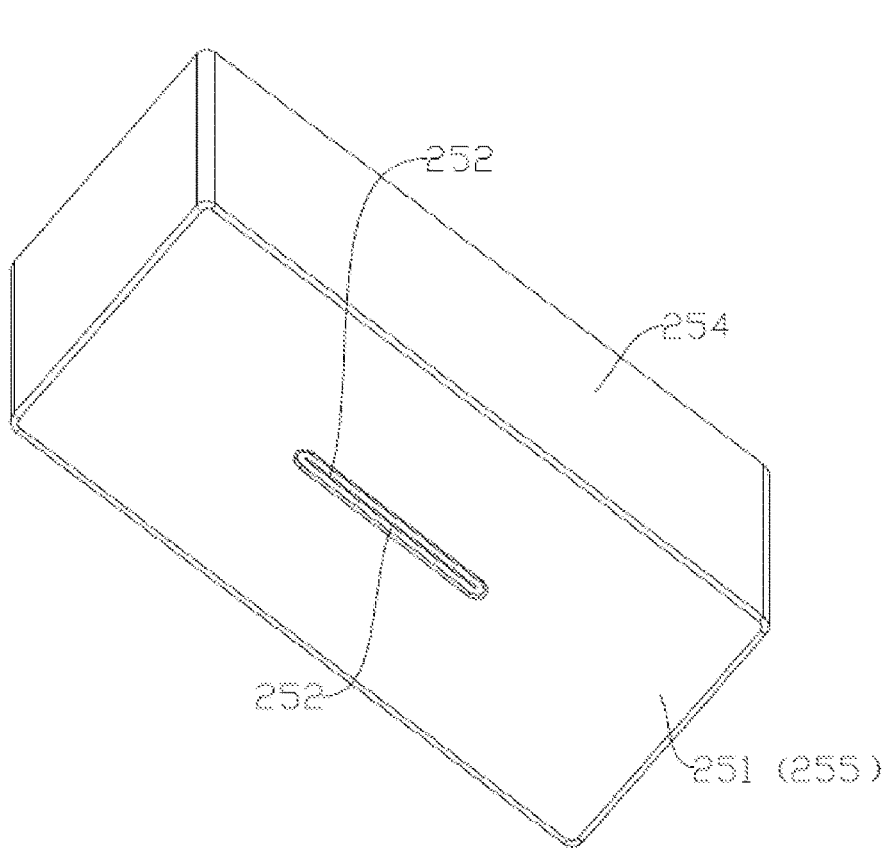
FIG. 4 is an axonometric view of a pressure relief apparatus provided by some embodiments of the present application.
Figure 5:
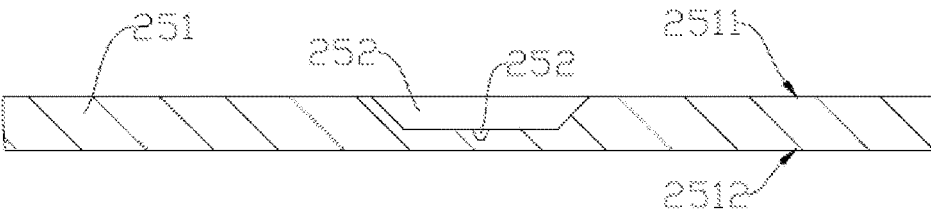
FIG. 5 is a cross-sectional view of the pressure relief part shown in FIG. 4.

Please refer to FIGS. 4 and 5. FIG. 4 is an axonometric view of a pressure relief apparatus 25 provided by some embodiments of the present application, and FIG. 5 is a cross-sectional view of the pressure relief part 251 shown in FIG. 4. An embodiment of the present application provides a pressure relief apparatus 25, the pressure relief apparatus 25 comprising a pressure relief part 251 and multi-stage score grooves 252, wherein the pressure relief part 251 has a first surface 2511 and a second surface 2512 in a thickness direction Z thereof that are opposite to each other; and the multi-stage score grooves 252 are sequentially arranged on the pressure relief part 251 in a direction from the first surface 2511 to the second surface 2512, wherein among two adjacent stages of score grooves 252 in the thickness direction Z, the stage of score groove 252 far from the first surface 2511 is arranged on the bottom surface of the stage of score groove 252 near the first surface 2511.

There may be two stages, three stages, four stages, etc., of score grooves 252 sequentially arranged on the pressure relief part 251 in the thickness direction Z thereof, and among two adjacent stages of score grooves 252, one stage of score groove 252 far from the first surface 2511 is arranged on the bottom surface of one stage of score groove 252 near the first surface 2511. The multi-stage score grooves 252 on the pressure relief part 251 may be machined and formed in various ways, such as stamping, milling, and the like. For example, taking the multi-stage score grooves 252 being formed by means of stamping as an example, the multi-stage score grooves 252 can be stamped sequentially on the pressure relief part 251 in the direction from the first surface 2511 to the second surface 2512. The score grooves 252 can be in various shapes, such as rectilinear, arc-shaped, U-shaped, H-shaped, ring-shaped, rectangular, circular, and the like. In the multi-stage score grooves 252 sequentially arranged in the thickness direction Z of the pressure relief part 251, the shapes of various stages of score grooves 252 can be the same or different. As an example, in FIGS. 4 and 5, two grades of score grooves 252 are arranged on the pressure relief part 251, and the two stages of score grooves 252 are both of rectilinear shapes.

The first surface 2511 and the second surface 2512 of the pressure relief part 251 are two surfaces of the pressure relief part 251 opposite to each other in the thickness direction Z thereof, and the distance between the first surface 2511 and the second surface 2512 is the thickness of the pressure relief part 251.

The pressure relief part 251 may be a component mounted on the end cover 23, for example, the pressure relief part 251 is a rupture disk mounted on the end cover 23; the pressure relief part 251 may also be used, as a whole, as the end cover 23; the pressure relief part 251 may be a part of the case 21, for example, the pressure relief part 251 may be a wall portion or a part of a wall portion of the case 21.

In the pressure relief apparatus 25, multi-stage score grooves 252 are arranged on the pressure relief part 251, wherein the multi-stage score grooves 252 are sequentially arranged on the pressure relief part 251 in the direction from the first surface 2511 to the second surface 2512 of the pressure relief part 251, and one stage of score groove 252 far from the first surface 2511 is arranged on the bottom surface of one stage of score groove 252 near the first surface 2511. The pressure relief apparatus 25 with this structure adopts a multi-stage score grooves 252 structure, which can reduce the forming depth of each stage of score groove 252, thereby reducing the forming force applied to the pressure relief part 251 when forming each stage of score groove 252, reducing the risk of cracks generated on the pressure relief part 251, so that the pressure relief apparatus 25 is not easy to fail due to cracking of the pressure relief part 251 at the position where the score grooves 252 are arranged, thus improving the long-term reliability of the pressure relief apparatus 25.

When forming the multi-stage score grooves 252 on the pressure relief part 251, the score grooves 252 can be formed on the pressure relief part 251 stage by stage in the direction from the first surface 2511 to the second surface 2512, and the forming depth of each stage of score groove 252 is relatively shallow, so that the pressure relief part 251 is subjected to less forming force, which can reduce the risk of cracks generated on the pressure relief part 251 and also improve the flatness of the first surface 2511 as well. In the process of machining the multi-stage score grooves 252 stage by stage in the direction from the first surface 2511 to the second surface 2512, the hardness of the pressure relief part 251 at the position where the score grooves 252 are arranged will increase with each machining of one stage of first-stage score groove 252, so that the hardness of the residual portion of the pressure relief part 251 after the multi-stage score grooves 252 have been arranged is improved, resulting in better long-term reliability, better impact resistance, and a lower probability of damage by external force impact.

Figure 6:
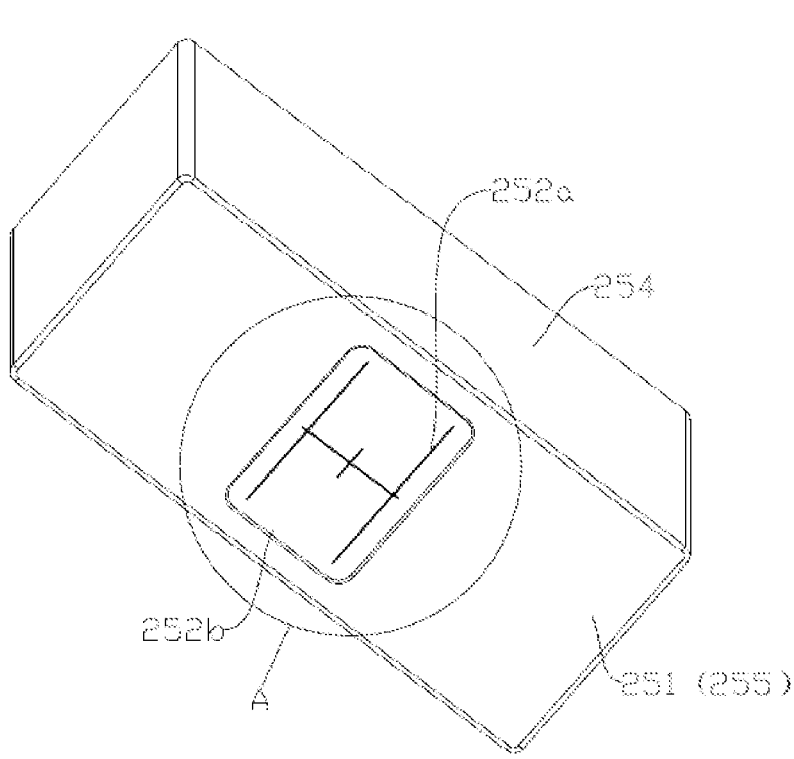
FIG. 6 is an axonometric view of a pressure relief apparatus provided by some other embodiments of the present application.
Figure 7:
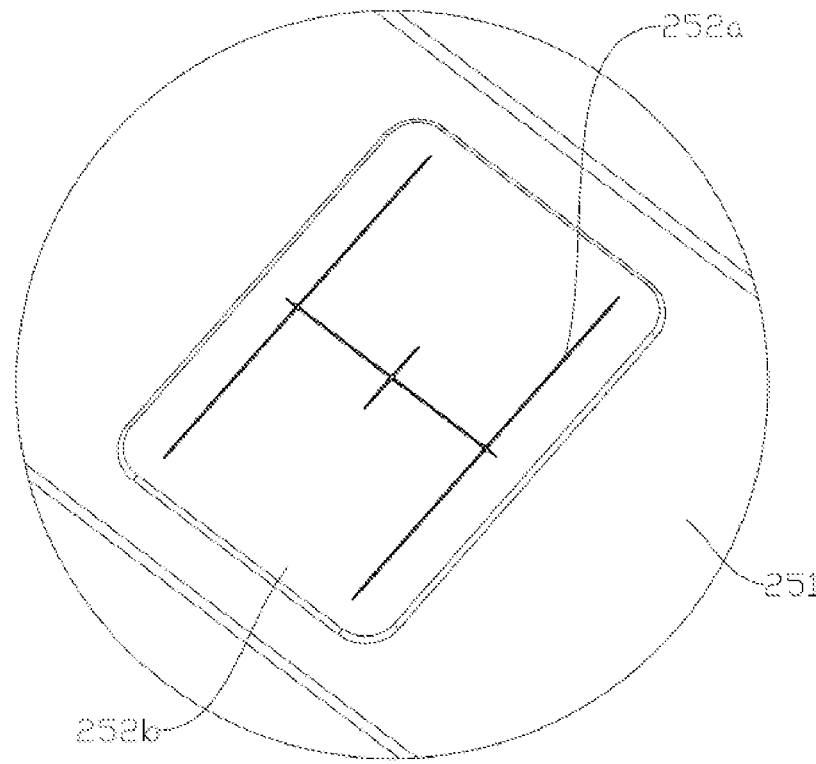
FIG. 7 is a partial enlarged view of the pressure relief apparatus shown in FIG. 6 at A.
Figure 8:
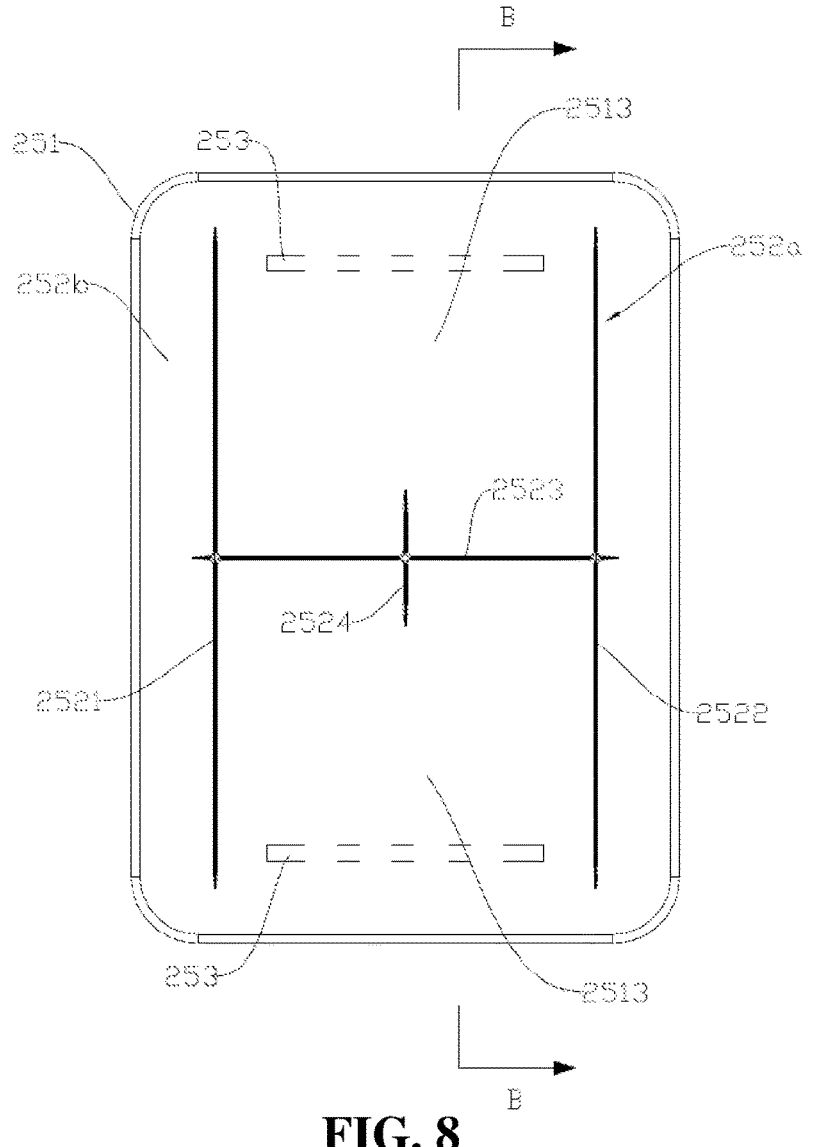
FIG. 8 is a partial view of the pressure relief part shown in FIG. 7.
Figure 9:
FIG. 9 is a B-B cross-sectional view of the pressure relief part shown in FIG. 8.

In some embodiments, reference is made to FIG. 6. FIG. 6 is an axonometric view of the pressure relief apparatus 25 provided in some further embodiments of the present application; FIG. 7 is a partial enlarged view of the pressure relief apparatus 25 shown in FIG. 6 at A; FIG. 8 is a partial view of the pressure relief part 251 shown in FIG. 7; and FIG. 9 is a B-B cross-sectional view of the pressure relief part 251 shown in FIG. 8. The multi-stage score grooves 252 comprise at least one stage of first-stage score groove 252a, the first-stage score groove 252a comprising a first groove segment 2521, a second groove segment 2522, and a third groove segment 2523, with the first groove segment 2521 and the second groove segment 2522 being oppositely arranged, and the first groove segment 2521 and the second groove segment 2522 both intersecting with the third groove segment 2523. The pressure relief part 251 comprises an opening region 2513, with the first groove segment 2521, the second groove segment 2522, and the third groove segment 2523 being arranged along the edge of the opening region 2513, and the opening region 2513 being configured to be openable with the first groove segment 2521, the second groove segment 2522, and the third groove segment 2523 as the boundary.

Among the multi-stage score grooves 252 on the pressure relief part 251, one stage of score groove 252 may be a first-stage score groove 252a, or, alternatively, multiple adjacent stages of score grooves 252 may be first-stage score grooves 252a, that is, one stage of first-stage score groove 252a, or multiple stages of first-stage score grooves 252a, may be arranged on the pressure relief part 251. If one stage of first-stage score groove 252a is arranged on the pressure relief part 251, it can be understood that one stage of score groove 252 in the multi-stage score grooves 252 is a first-stage score groove 252a; and if multiple stages of first-stage score grooves 252a are arranged on the pressure relief part 251, it can be understood that multiple stages of score grooves 252 in the multi-stage score grooves 252 are first-stage score grooves 252a. For example, if three stages of score grooves 252 are arranged on the pressure relief part 251, two or three stages of score grooves 252 may be first-stage score grooves 252a. The first-stage score groove 252a comprises multiple groove segments, among which one is a first groove segment 2521, another one is a second groove segment 2522, and yet another one is a third groove segment 2523.

The first groove segment 2521, the second groove segment 2522, and the third groove segment 2523 may all be rectilinear grooves, the first groove segment 2521 may be parallel to the second groove segment 2522, and the first groove segment 2521 and the second groove segment 2522 may be perpendicular to the third groove segment 2523. The first groove segment 2521 may intersect with the third groove segment 2523 at a position at one end of the third groove segment 2523 or at a position deviating from the one end of the third groove segment 2523 such that the one end of the third groove segment 2523 is beyond the first groove segment 2521 in the direction of extension of the third groove segment 2523. The second groove segment 2522 may intersect with the third groove segment 2523 at a position at the other end of the third groove segment 2523 or at a position deviating from the other end of the third groove segment 2523 such that the other end of the third groove segment 2523 is beyond the second groove segment 2522 in the direction of extension of the third groove segment 2523. The third groove segment 2523 may be located at the end portions of the first groove segment 2521 and the second groove segment 2522, for example, the first groove segment 2521, the third groove segment 2523, and the second groove segment 2522 are connected in sequence to form a U-shape. The third groove segment 2523 may also be located at an intermediate position between the first groove segment 2521 and the second groove segment 2522. For example, as shown in FIG. 8, the first groove segment 2521, the second groove segment 2522, and the third groove segment 2523 form an H-shape.

If, in the thickness direction Z of the pressure relief part 251, multiple stages of first-stage score grooves 252a are arranged on the pressure relief part 251, among two adjacent stages of first-stage score grooves 252a, the first groove segment 2521 in one stage of first-stage score groove 252a far from the first surface 2511 is arranged on the bottom surface of the first groove segment 2521 in one stage of first-stage score groove 252a near the first surface 2511, and the two adjacent stages of first groove segments 2521 have the same direction of extension; the second groove segment 2522 in one stage of one stage of first-stage score groove 252a far from the first surface 2511 is arranged on the bottom surface of the second groove segment 2522 in one stage of first-stage score groove 252a near the first surface 2511, and the two adjacent stages of second groove segments 2522 have the same direction of extension; and the third groove segment 2523 in one stage of first-stage score groove 252a far from the first surface 2511 is arranged on the bottom surface of the third groove segment 2523 in one stage of first-stage score groove 252a near the first surface 2511, and the two adjacent stages of third groove segments 2523 have the same direction of extension.

In this embodiment, the opening region 2513 is openable with the first groove segment 2521, the second groove segment 2522, and the third groove segment 2523 as the boundary, thus increasing the pressure relief area of the pressure relief part 251 and increasing the pressure relief rate of the pressure relief part 251.

In some embodiments, with continued reference to FIG. 8, the first-stage score groove 252a further comprises a fourth groove segment 2524, with the fourth groove segment 2524 being located between the first groove segment 2521 and the second groove segment 2522, and the fourth groove segment 2524 intersecting with the third groove segment 2523.

The first-stage score groove 252a further comprises the fourth groove segment 2524, and it can be understood that there further exists a groove segment in the first-stage score groove 252a as the fourth groove segment 2524. This may mean that only the first groove segment 2521, the second groove segment 2522, the third groove segment 2523, and the fourth groove segment 2524 are included in the first-stage score groove 252a, or that other groove segments are included in addition to all the four of the first groove segment 2521, the second groove segment 2522, the third groove segment 2523, and the fourth groove segment 2524.

The fourth groove segment 2524 may be a rectilinear groove, and the fourth groove segment 2524 may be parallel to the first groove segment 2521 and the second groove segment 2522 and perpendicular to the third groove segment 2523. The fourth groove segment 2524 intersects with the third groove segment 2523 at the midpoint position of the fourth groove segment 2524 and at the midpoint position of the third groove segment 2523. The length of the fourth groove segment 2524 is less than the lengths of the first groove segment 2521 and the second groove segment 2522.

If, in the thickness direction Z of the pressure relief part 251, multiple stages of first-stage score grooves 252a are arranged on the pressure relief part 251, among two adjacent stages of first-stage score grooves 252a, the fourth groove segment 2524 in one stage of first-stage score groove 252a far from the first surface 2511 is arranged on the bottom surface of the fourth groove segment 2524 in one stage of first-stage score groove 252a near the first surface 2511, and the two adjacent stages of fourth groove segments 2524 have the same direction of extension.

In this embodiment, the fourth groove segment 2524 located between the first groove segment 2521 and the second groove segment 2522 intersects with the third groove segment 2523, and the stress of the pressure relief part 251 at the position of intersection of the third groove segment 2523 with the fourth groove segment 2524 is more concentrated, and it is easier to break, so that the pressure relief part 251 breaks along the third groove segment 2523 from the position of intersection of the third groove segment 2523 with the fourth groove segment 2524 during the pressure relief process, and then breaks along the first groove segment 2521 and the second groove segment 2522 after the third groove segment 2523 breaks, so as to realize rapid pressure relief.

In some embodiments, in the direction of extension of the third groove segment 2523, the distance from the position of intersection of the fourth groove segment 2524 with the third groove segment 2523 to the first groove segment 2521 is equal to the distance from the position of intersection of the fourth groove segment 2524 with the third groove segment 2523 to the second groove segment 2522.

In the direction of extension of the third groove segment 2523, the distance from the position of intersection of the fourth groove segment 2524 with the third groove segment 2523 to the first groove segment 2521 is the length of the portion of the third groove segment 2523 between the fourth groove segment 2524 and the first groove segment 2521. In the direction of extension of the third groove segment 2523, the distance from the position of intersection of the fourth groove segment 2524 with the third groove segment 2523 to the second groove segment 2522 is the length of the portion of the third groove segment 2523 between the fourth groove segment 2524 and the second groove segment 2522. The fourth groove segment 2524 can be arranged at the midpoint position of the third groove segment 2523, so that the distance from the position of intersection of the fourth groove segment 2524 with the third groove segment 2523 to the first groove segment 2521 is equal to the distance from the position of intersection of the fourth groove segment 2524 with the third groove segment 2523 to the second groove segment 2522.

In this embodiment, the distance from the position of intersection of the fourth groove segment 2524 with the third groove segment 2523 to the first groove segment 2521 is equal to the distance from the position of intersection of the fourth groove segment 2524 with the third groove segment 2523 to the second groove segment 2522, so that the pressure relief part 251 can break along the first groove segment 2521 and the second groove segment 2522 synchronously after breaking along the third groove segment 2523 at the position of intersection of the fourth groove segment 2524 with the third groove segment 2523, thus allowing the opening region 2513 to open more quickly.

In some embodiments, with continued reference to FIG. 8, the first groove segment 2521, the second groove segment 2522, and the third groove segment 2523 define at least one opening region 2513.

The opening region 2513 is defined jointly by the first groove segment 2521, the second groove segment 2522, and the third groove segment 2523, and the first-stage score groove 252a is not in a closed structure. The number of opening regions 2513 defined by the first groove segment 2521, the second groove segment 2522, and the third groove segment 2523 may be one or two. For example, the first groove segment 2521, the second groove segment 2522, and the third groove segment 2523 form an approximately U-shaped structure and there is one opening region 2513; for another example, the first groove segment 2521, the second groove segment 2522, and the third groove segment 2523 form an approximately H-shaped structure and there are two opening regions 2513.

In this embodiment, the opening region 2513 is defined jointly by the first groove segment 2521, the second groove segment 2522, and the third groove segment 2523, and the opening region 2513 can be opened in a flipping manner, and the opening region 2513 is always connected to other regions of the pressure relief part 251 after being opened, so that it is not easy to fall off, thus reducing the risk of splashing after the opening region 2513 is opened.

In some embodiments, with continued reference to FIG. 8, the first groove segment 2521, the second groove segment 2522, and the third groove segment 2523 define two opening regions 2513, the two opening regions 2513 being located on two sides of the third groove segment 2523, respectively.

The first groove segment 2521, the second groove segment 2522, and the third groove segment 2523 jointly define two opening regions 2513, and the first groove segment 2521, the second groove segment 2522, and the third groove segment 2523 may form an approximately H-shaped structure. The third groove segment 2523 and the first groove segment 2521 may intersect at the midpoint position of the first groove segment 2521, and the third groove segment 2523 and the second groove segment 2522 may intersect at the midpoint position of the second groove segment 2522.

The two opening regions 2513 are located on two sides of the third groove segment 2523, respectively, so that the two opening regions 2513 are divided taking the third groove segment 2523 as the boundary, and after the pressure relief part 251 breaks at the position of the third groove segment 2523, the two opening regions 2513 will open in a counter-opening manner along the first groove segment 2521 and the second groove segment 2522 to achieve pressure relief, which increases the pressure relief area and can thus effectively improve the pressure relief rate of the pressure relief part 251.

It is noted that the first groove segment 2521, the second groove segment 2522, and the third groove segment 2523 can define two opening regions 2513 regardless of whether the first-stage score groove 252a comprises the fourth groove segment 2524.

In some embodiments, with continued reference to FIGS. 8 and 9, the second surface 2512 is provided with a notch groove 253 located in the opening region 2513, and the notch groove 253 is at a distance from the third groove segment 2523 in the direction of extension of the first groove segment 2521.

The second surface 2512 is provided with a notch groove 253 located in the opening region 2513, and it can be understood that the notch groove 253 is recessed from the second surface 2512 in a direction facing the first surface 2511. Of course, this may mean that the notch groove 253 is entirely located within the opening region 2513, or that the notch groove 253 is partially located within the opening region 2513. The notch groove 253 may extend in the direction of extension of the third groove segment 2523 so that the notch groove 253 is parallel to the third groove segment 2523.

In embodiments where the first groove segment 2521, the second groove segment 2522, and the third groove segment 2523 jointly define one opening region 2513, the first surface 2511 may be arranged with one notch groove 253 correspondingly. As shown in FIGS. 8 and 9, in embodiments where the first groove segment 2521, the second groove segment 2522, and the third groove segment 2523 jointly define two opening regions 2513, the first surface 2511 may be arranged with two notch grooves 253 correspondingly, wherein one notch groove 253 is arranged correspondingly to one opening region 2513.

In this embodiment, the notch groove 253 is at a distance from the third groove segment 2523 in the direction of extension of the first groove segment 2521, and the notch groove 253 is located within the opening region 2513, so that during the pressure relief process of the pressure relief part 251, a portion of the pressure relief part 251 that is located in the opening region 2513 can be flipped with the position of the pressure relief part 251 in the notch groove 253 as the axis, which makes it easier to open for pressure relief.

In some embodiments, as shown in FIG. 9, the multi-stage score grooves 252 comprise one stage of first-stage score groove 252a.

It can be understood that among the multi-stage score grooves 252, only one stage of score groove 252 is a first-stage score groove 252a. For example, two stages of score grooves 252 are arranged on the pressure relief part 251, wherein one stage of score groove 252 is a first-stage score groove 252a.

In this embodiment, the multi-stage score grooves 252 have only one stage of first-stage score groove 252a, which is simple to mold, thus improving the production efficiency and facilitating reduction in production costs.

Figure 10:
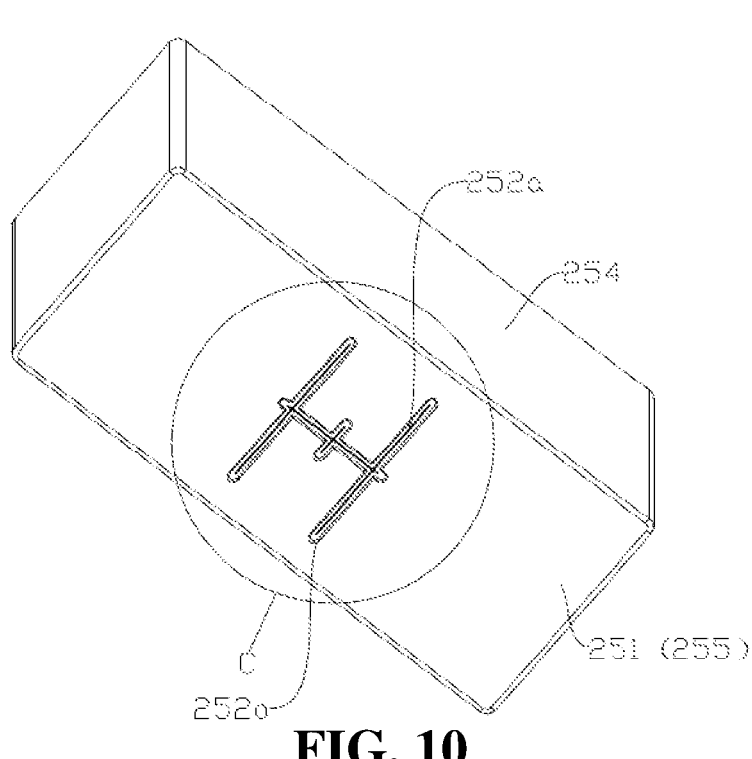
FIG. 10 is an axonometric view of a pressure relief apparatus provided by some further embodiments of the present application.
Figure 11:
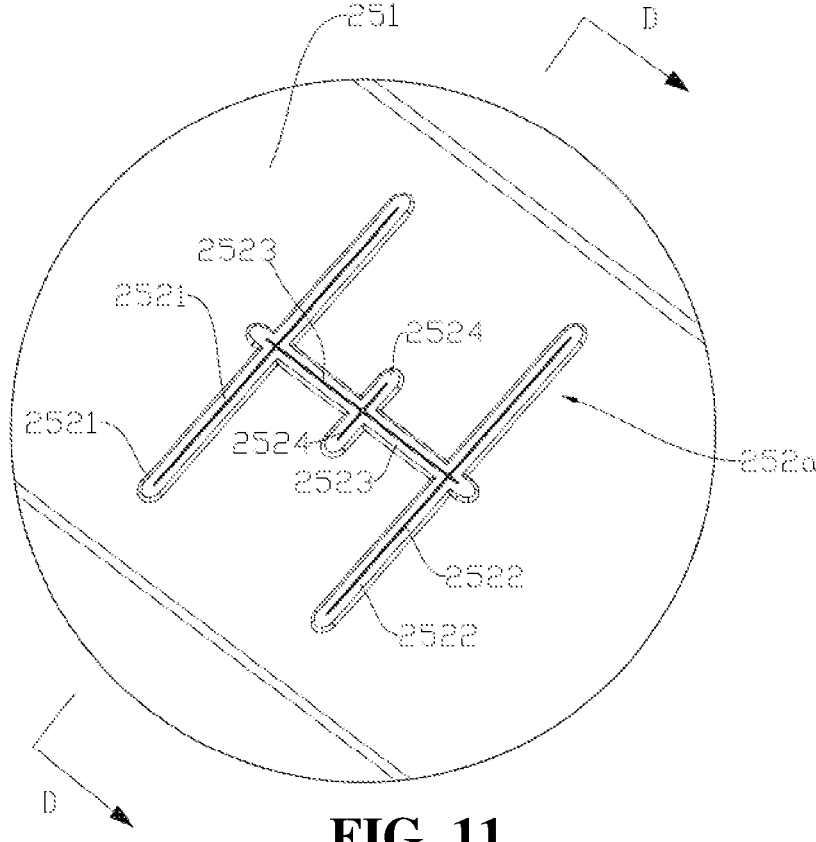
FIG. 11 is a partial enlarged view of the pressure relief apparatus shown in FIG. 10 at C.
Figure 12:
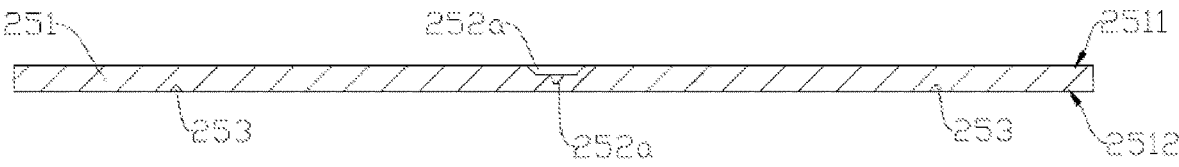
FIG. 12 is a D-D cross-sectional view of the pressure relief part shown in FIG. 11.

In some embodiments, reference is made to FIGS. 10 to 12. FIG. 10 is an axonometric view of a pressure relief apparatus 25 provided by some further embodiments of the present application, FIG. 11 is a partial enlarged view of the pressure relief apparatus 25 shown in FIG. 10 at C; and FIG. 12 is a D-D cross-sectional view of the pressure relief part 251 shown in FIG. 11. The multi-stage score grooves 252 comprise multiple stages of first-stage score grooves 252a, and the multiple stages of first-stage score grooves 252a are sequentially arranged in the direction from the first surface 2511 to the second surface 2512.

Among two adjacent stages of first-stage score grooves 252a, one stage of first-stage score groove 252a far from the first surface 2511 is arranged on the bottom surface of one stage of first-stage score groove 252a near the first surface 2511.

Two stages, three stages, four stages or five stages of first-stage score grooves 252a may be arranged on the pressure relief part 251. Among the multi-stage score grooves 252 on the pressure relief part 251, they may all be first-stage score grooves 252a, or may partially be first-stage score grooves 252a. Taking three grades of score grooves 252 being arranged on the pressure relief part 251 as an example, two stages of score grooves 252 may be first-stage score grooves 252a, or, alternatively, all three stages of score grooves 252 may be first-stage score grooves 252a.

In this embodiment, the multiple stages of first-stage score grooves 252a are sequentially arranged in the direction from the first surface 2511 to the second surface 2512, so that the forming depth of each stage of first-stage score groove 252a can be reduced, thereby reducing the forming force applied to the pressure relief part 251 when forming each stage of first-stage score groove 252a, and reducing the risk of cracks generated on the pressure relief part 251. In the process of machining the first-stage score grooves 252a stage by stage in the direction from the first surface 2511 to the second surface 2512, the hardness of the residual portion of the pressure relief part 251 at the position where the first-stage score grooves 252a are arranged will increase with each machining of one stage of first-stage score groove 252a, so that the hardness of the residual portion of the pressure relief part 251 after the multiple stages of first-stage score grooves 252a have been arranged is improved, resulting in better long-term reliability, better impact resistance, and a lower probability of damage by external force impact.

In some embodiments, with continued reference to FIG. 12, the outermost stage of first-stage score groove 252a is arranged on the first surface 2511.

The outermost stage of first-stage score groove 252a is recessed from the first surface 2511 in a direction facing the second surface 2512. As shown in FIG. 12, taking two stages of first-stage score grooves 252a being arranged on the pressure relief part 251 as an example, the outermost stage of first-stage score groove 252a is arranged on the first surface 2511, and the other stage of first-stage score groove 252a is arranged on the bottom surface of the outermost stage of first-stage score groove 252a.

In this embodiment, the outermost stage of first-stage score groove 252a is arranged on the first surface 2511, wherein the outermost stage of first-stage score groove 252a can be formed directly on the first surface 2511, which simplifies the structure of the pressure relief apparatus 25, thus reducing the production cost.

In some embodiments, the multi-stage score grooves 252 comprise two stages of first-stage score grooves 252a.

It can be understood that among the multi-stage score grooves 252, only two stages of score grooves 252 are first-stage score grooves 252a. If the number of stages of the score grooves 252 on the pressure relief part 251 is greater than two, only some score grooves 252 among the multi-stage score grooves 252 are first-stage score grooves 252a. As shown in FIG. 12, if only two stages of score grooves 252 are arranged on the pressure relief part 251, the two stages of score grooves 252 are both first-stage score grooves 252a.

Figure 13:
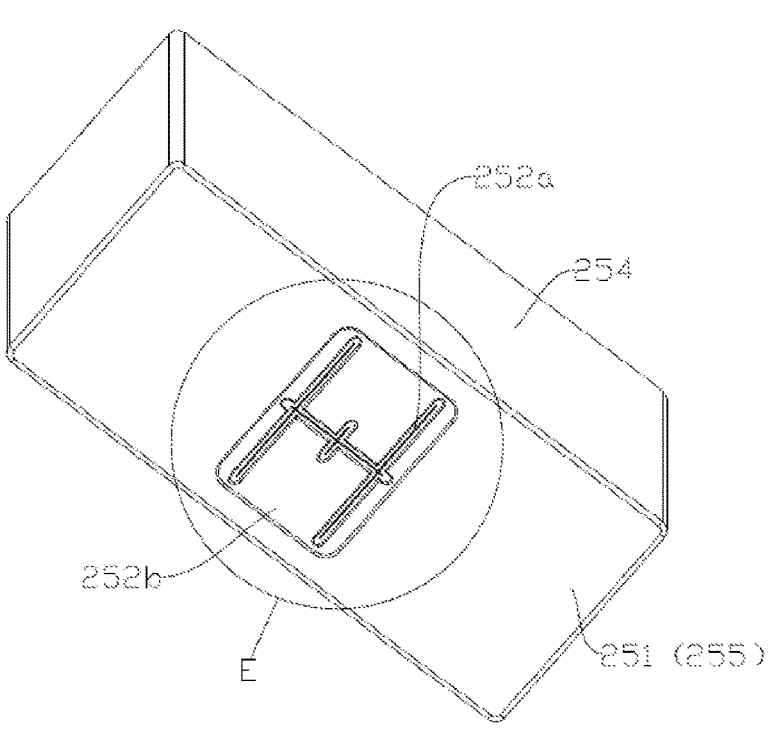
FIG. 13 is an axonometric view of a pressure relief apparatus provided by some other embodiments of the present application.
Figure 14:
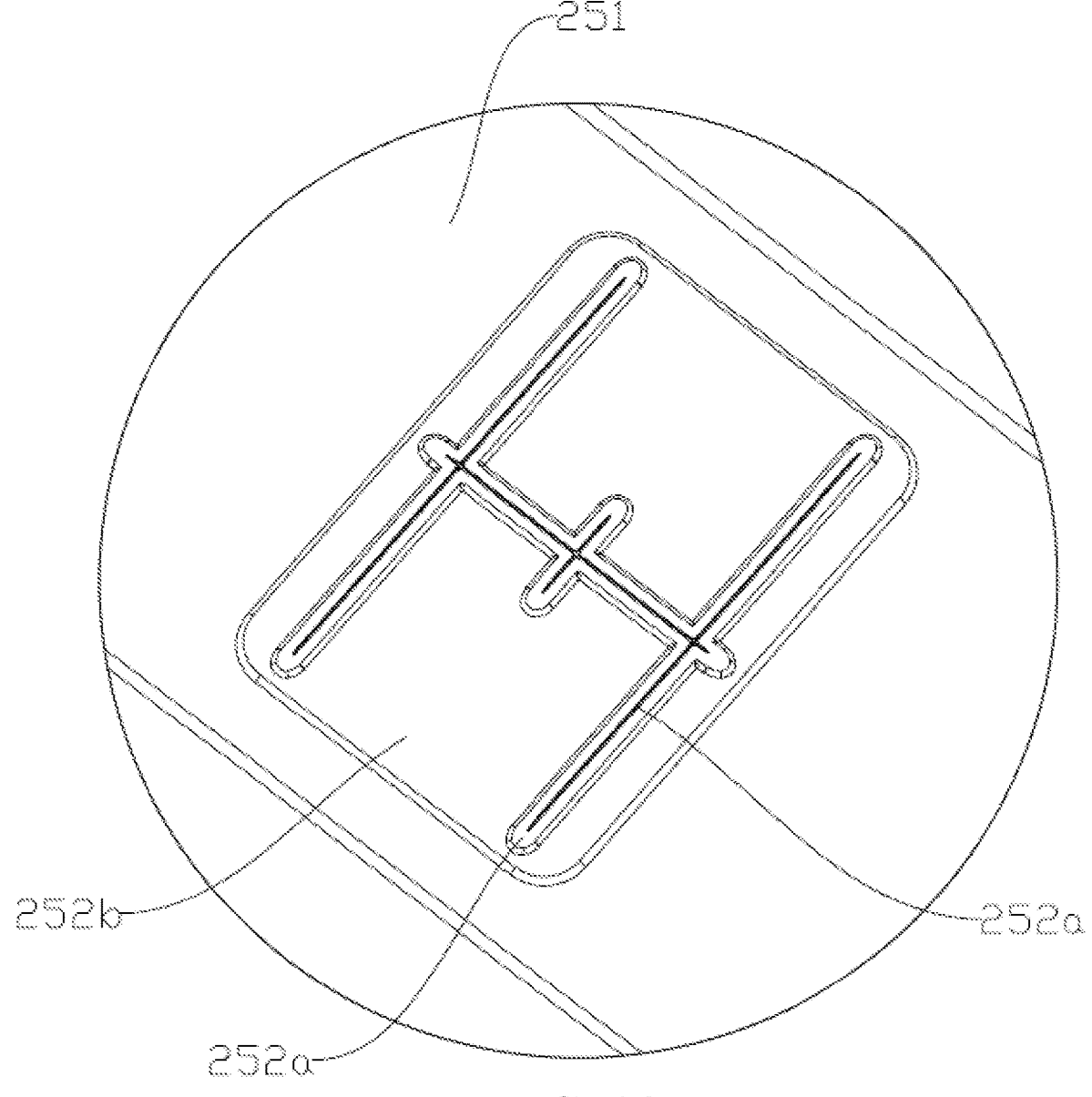
FIG. 14 is a partial enlarged view of the pressure relief apparatus shown in FIG. 13 at E.
Figure 15:
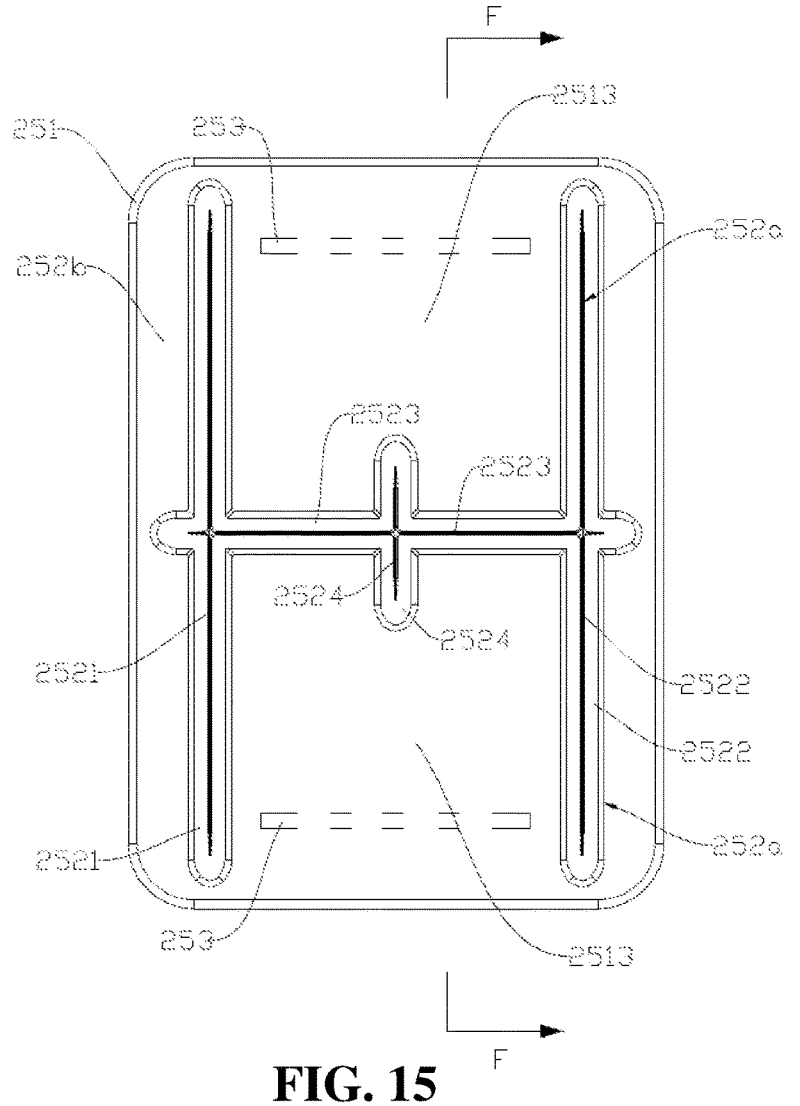
FIG. 15 is a partial view of the pressure relief part shown in FIG. 14.
Figure 16:
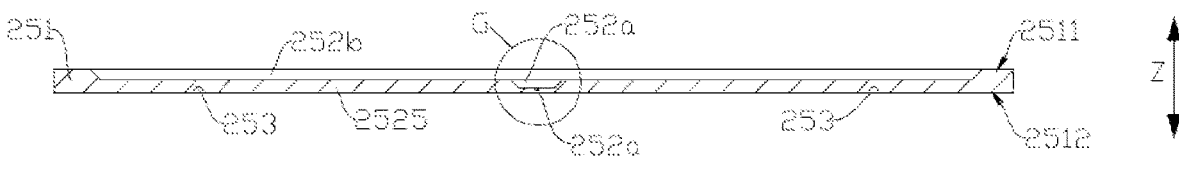
FIG. 16 is a F-F cross-sectional view of the pressure relief part shown in FIG. 15.

In some embodiments, reference is made to FIGS. 13 to 16. FIG. 13 is an axonometric view of the pressure relief apparatus 25 provided in some further embodiments of the present application; FIG. 14 is a partial enlarged view of the pressure relief apparatus 25 shown in FIG. 13 at E; FIG. 15 is a partial view of the pressure relief part 251 shown in FIG. 14; and FIG. 16 is a F-F cross-sectional view of the pressure relief part 251 shown in FIG. 15. The multi-stage score grooves 252 further comprise at least one stage of second-stage score groove 252b, the at least one stage of second-stage score groove 252b and the at least one stage of first-stage score groove 252a being arranged sequentially in the direction from the first surface 2511 to the second surface 2512. Here, the opening region 2513 is formed on the groove bottom wall 2525 of one stage of second-stage score groove 252b farthest from the first surface 2511.

One stage of second-stage score groove 252b, or multiple stages of second-stage score grooves 252b, may be arranged on the pressure relief part 251. If multiple stages of second-stage score grooves 252b are arranged on the pressure relief part 251, the multiple stages of second-stage score grooves 252b are sequentially arranged on the pressure relief part 251 in the direction from the first surface 2511 to the second surface 2512, and the outline of the bottom surface of each stage of second-stage score groove 252b is reduced stage by stage. Of course, one stage of first-stage score groove 252a, or multiple stages of first-stage score grooves 252a, may be arranged on the pressure relief part 251.

The at least one stage of second-stage score groove 252b and the at least one stage of first-stage score groove 252a are sequentially arranged on the pressure relief part 251 in the direction from the first surface 2511 to the second surface 2512, and during forming, all second-stage score grooves 252b can be formed on the pressure relief part 251 first in the direction from the first surface 2511 to the second surface 2512, and then all score grooves 252 can be formed. It can be understood that one stage of first-stage score groove 252a nearest to the first surface 2511 is arranged on the bottom surface of one stage of second-stage score groove 252b farthest from the first surface 2511. If only one stage of second-stage score groove 252b is arranged in the pressure relief part 251, this stage of second-stage score groove 252b is not only one stage of second-stage score groove 252b nearest to the first surface 2511 but also one stage of second-stage score groove 252b farthest from the first surface 2511. Likewise, if only one stage of first-stage score groove 252a is arranged in the pressure relief part 251, this stage of first-stage score groove 252a is not only one stage of first-stage score groove 252a nearest to the first surface 2511 but also one stage of first-stage score groove 252a farthest from the first surface 2511.

The groove bottom wall 2525 of the stage of second-stage score groove 252b farthest from the first surface 2511 is the portion of the pressure relief part 251 below the bottom surface of the stage of second-stage score groove 252b farthest from the first surface 2511, and after the stage of second-stage score groove 252b farthest from the first surface 2511 is formed on the pressure relief part 251, the residual portion of the region where this stage of second-stage score groove 252b is arranged on the pressure relief part 251 is the groove bottom wall 2525 of the stage of second-stage score groove 252b farthest from the first surface 2511. As shown in FIG. 16, taking one stage of second-stage score groove 252b being arranged on the pressure relief part 251 as an example, the portion of the pressure relief part 251 below the bottom surface of this second-stage score groove 252b is the groove bottom wall 2525 of the stage of second-stage score groove 252b farthest from the first surface 2511.

The opening region 2513 is formed on the groove bottom wall 2525 of the stage of second-stage score groove 252b farthest from the first surface 2511, and the opening region 2513 is the portion of the groove bottom wall 2525 of the stage of second-stage score groove 252b farthest from the first surface 2511 that is openable with the stage of first-stage score groove 252a farthest from the first surface 2511 as the boundary during pressure relief.

During forming, the second-stage score groove 252b can be formed on the pressure relief part 251 first, so that the pressure relief part 251 is overall thinned in the region where the second-stage score groove 252b is arranged and the hardness of the residual portion in this region is increased; then, the first-stage score groove 252a is formed on the pressure relief part 251, so that the hardness of the pressure relief part 251 in the residual portion at the position of the first-stage score groove 252a is further increased, resulting in better long-term reliability, better impact resistance, and a lower probability of damage by external force impact. In addition, since the opening region 2513 is formed on the groove bottom wall 2525 of the stage of second-stage score groove 252*b* farthest from the first surface 2511, the second-stage score groove 252*b* can provide an avoidance space for the opening region 2513 in the opening process, and the opening region 2513 can still be opened for pressure relief even if the first surface 2511 is blocked by an obstacle.

In some embodiments, with continued reference to FIG. 16, the multi-stage score grooves 252 comprise one stage of second-stage score groove 252*b*, the second-stage score groove 252*b* being arranged on the first surface 2511.

Among the multi-stage score grooves 252, only one stage of score groove 252 is a second-stage score groove 252*b*. In the case where one stage of second-stage score groove 252*b* is arranged on the pressure relief part 251, one stage of first-stage score groove 252*a*, or multiple stages of first-stage score grooves 252*a*, may be arranged on the pressure relief part 251.

As an example, as shown in FIG. 16, taking three stages of score grooves 252 being arranged on the pressure relief part 251 as an example, the outermost stage of score groove 252 is a second-stage score groove 252*b*, and the other two stages of score grooves 252 are first-stage score grooves 252*a*, among which one stage of first-stage score groove 252*a* is arranged on the bottom surface of the second-stage score groove 252*b*, and the other stage of first-stage score groove 252*a* is arranged on the bottom surface of the stage of first-stage score groove 252*a*.

In this embodiment, the pressure relief part 251 is arranged with one stage of second-stage score groove 252*b*, which is simple to mold, thus improving the production efficiency and reducing production costs.

In some embodiments, the multi-stage score grooves 252 comprise multiple stages of said second-stage score grooves 252*b*, the multiple stages of said second-stage score grooves 252*b* being sequentially arranged in the direction from the first surface 2511 to the second surface 2512, with the outermost stage of second-stage score groove 252*b* being arranged on the first surface 2511.

Among two adjacent stages of second-stage score grooves 252*b*, one stage of second-stage score groove 252*b* far from the first surface 2511 is arranged on the bottom surface of one stage of second-stage score groove 252*b* near the first surface 2511. One stage of first-stage score groove 252*a* nearest to the first surface 2511 is arranged on the bottom surface of one stage of second-stage score groove 252*b* farthest from the first surface 2511. In the case where multiple stages of second-stage score grooves 252*b* are arranged on the pressure relief part 251, one stage of first-stage score groove 252*a*, or multiple stages of first-stage score grooves 252*a*, may be arranged on the pressure relief part 251.

Among the multi-stage score grooves 252, two stages, three stages, four stages or five stages of score grooves 252 are second-stage score grooves 252*b*. In other words, two stages, three stages, four stages or five stages, etc., of second-stage score grooves 252*b* may be arranged on the pressure relief part 251. The outermost stage of second-stage score groove 252*b* is recessed from the first surface 2511 in the direction approaching the second surface 2512.

In this embodiment, the pressure relief part 251 is arranged with multiple stages of second-stage score grooves 252*b*, so that the forming depth of each stage of second-stage score groove 252*b* is relatively shallow, which can reduce the forming force applied to the pressure relief part 251 during forming of each stage of second-stage score groove 252*b* and reduce the risk of cracks generated on the pressure relief part 251. When machining the multiple stages of second-stage score grooves 252*b* stage by stage in the direction from the first surface 2511 to the second surface 2512, the hardness of the residual portion of the pressure relief part 251 in the region where the second-stage score grooves 252*b* are arranged will increase with each machining of one stage of second-stage score groove 252*b*, so that the hardness of the residual portion of the pressure relief part 251 in the region of the first-stage score grooves 252*a* is further improved. In addition, among the multiple stages of second-stage score grooves 252*b*, the outer a second-stage notch groove 252*b* is, the larger the size of the outline of the cross section (perpendicular to the thickness direction Z of the pressure relief part 251), so the multiple stages of second-stage notch groove 252*b* can provide more avoidance space for the opening of the opening region 2513.

In some embodiments, the second-stage score groove 252*b* is a circular groove or a rectangular groove.

If the score groove is a rectangular groove, the cross section of the groove side face of the score groove is rectangular. If the score groove is a circular groove, the cross section of the groove side face of the score groove is circular. Here, the cross section is perpendicular to the thickness direction Z of the pressure relief part 251.

As an example, in FIGS. 13 to 16, the second-stage score groove 252*b* is a rectangular groove.

In this embodiment, the second-stage score groove 252*b* is a circular groove or a rectangular groove, and the second-stage score groove 252*b* has a simple structure and is thus easy to mold, which can provide more avoidance space for the opening of the opening region 2513.

In some embodiments, each stage of the score grooves 252 comprises at least one groove segment, and among two adjacent groove segments in the thickness direction Z, a maximum width of the groove segment far from the first surface 2511 is less than a minimum width of the groove segment near the first surface 2511.

It can be understood that among two adjacent groove segments in the thickness direction Z, the groove segment far from the first surface 2511 is arranged on the bottom surface of the groove segment near the first surface 2511.

The number of groove segments in the score groove 252 may be one or more, and if the number of groove segments in the score groove 252 is one, the groove segment is the score groove 252. For example, if the score groove 252 is a rectilinear groove, a rectangular groove, or a circular groove, the number of groove segments in the score groove 252 is one; for another example, if the score groove 252 is H-shaped, the number of groove segments in the score groove 252 is multiple. For a second-stage score groove 252*b*, the number of groove segments in the second-stage score groove 252*b* is one; and for a first-stage score groove 252*a*, the number of groove segments in the first-stage score groove 252*a* is multiple. For two adjacent stages of score grooves 252, if the numbers of groove segments in the two stages of score grooves 252 are both multiple, groove segments in one stage of score groove 252 may correspond to groove segments in the other stage of score groove 252 on a one-to-one basis; and if the number of groove segments in one stage of score groove 252 near the first surface 2511 is one and the number of groove segments in one stage of score groove 252 far from the first surface 2511 is multiple, then the multiple groove segments in the stage of score groove 252 far from the first surface 2511 can be arranged on the bottom surface of the one groove segment in the stage of score groove 252 near the first surface 2511.

Among two groove segments adjacent in the thickness direction Z of the pressure relief part 251, the maximum width of one groove segment far from the first surface 2511 is less than the minimum width of one groove segment near the first surface 2511, that is, the widths of the groove segments of the multi-stage score grooves 252 decrease stage by stage in the direction from the first surface 2511 to the second surface 2512. The maximum width of one groove segment far from the first surface 2511 does not limit the width of one groove among the two adjacent groove segments that is far from the first surface 2511 to be gradually changed, and in the case where the width of the one groove segment far from the first surface 2511 does not change in the thickness direction Z of the pressure relief part 251, the width of the one groove segment far from the first surface 2511 may also be called the maximum width. The minimum width of one groove segment near the first surface 2511 does not limit the width of one groove segment among the two adjacent groove segments that is near the first surface 2511 to be gradually changed, and in the case where the width of the one groove segment near the first surface 2511 does not change in the thickness direction Z of the pressure relief part 251, the width of the groove segment of the stage of score groove 252 near the first surface 2511 may also be called the minimum width.

The maximum width of the one groove segment far from the first surface 2511 and the minimum width of the one groove segment near the first surface 2511 are the sizes, in the same direction, of the two groove segments adjacent in the thickness direction Z.

Taking the two adjacent stages of score grooves 252 being first-stage score grooves 252a as an example, it can be understood that the maximum width of the first groove segment 2521 of one stage of first-stage score groove 252a far from the first surface 2511 (one groove segment far from the first surface 2511) is less than the minimum width of the first groove segment 2521 of one stage of first-stage score groove 252a near the first surface 2511 (one groove segment near the first surface 2511); the maximum width of the second groove segment 2522 of the stage of first-stage score groove 252a far from the first surface 2511 (one groove segment far from the first surface 2511) is less than the minimum width of the second groove segment 2522 of the stage of first-stage score groove 252a near the first surface 2511 (one groove segment near the first surface 2511); and the maximum width of the third groove segment 2523 of the stage of first-stage score groove 252a far from the first surface 2511 (one groove segment far from the first surface 2511) is less than the minimum width of the third groove segment 2523 of the stage of first-stage score groove 252a near the first surface 2511 (one groove segment near the first surface 2511).

Taking the two adjacent stages of score grooves 252 being a second-stage score groove 252b and a first-stage score groove 252a, respectively, as an example, it can be understood that the first-stage score groove 252a is arranged on the bottom surface of the second-stage score groove 252b, and the maximum width of the first groove segment 2521 of the first-grade score groove 252a (one groove segment far from the first surface 2511) is less than the minimum width of the second-grade score groove 252b (one groove segment near the first surface 2511); the maximum width of the second groove segment 2522 of the first-grade score groove 252a (one groove segment far from the first surface 2511) is less than the minimum width of the second-grade score groove 252b (one groove segment near the first surface 2511); and the maximum width of the third groove segment 2523 of the first-grade score groove 252a (one groove segment far from the first surface 2511) is less than the minimum width of the second-grade score groove 252b (one groove segment near the first surface 2511).

In this embodiment, the widths of the groove segments of the various stages of score grooves 252 decrease stage by stage in the direction from the first surface 2511 to the second surface 2512, and during forming, the groove segments of the various stages of score grooves 252 can be formed sequentially in the direction from the first surface 2511 to the second surface 2512, which facilitates the forming of the groove segments of the various stages of score grooves 252.

Figure 17:
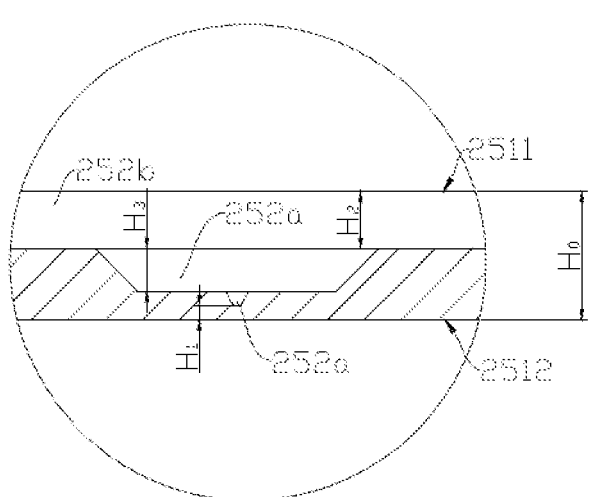
FIG. 17 is a partial enlarged view of the pressure relief part shown in FIG. 16 at G.

In some embodiments, reference is made to FIG. 17. FIG. 17 is a partial enlarged view of the pressure relief part 251 shown in FIG. 16 at G. The distance between the first surface 2511 and the second surface 2512 is $H_0$, and the distance from the bottom surface of one stage of score groove 252 that is nearest to the second surface 2512 to the second surface 2512 is $H_1$, which satisfy the following condition: $H_1/H_0<0.2$.

$H_1/H_0$ may be any value less than 0.2, for example, 0.05, 0.08, 0.1, 0.13, 0.15, 0.18, etc.

The distance between the first surface 2511 and the second surface 2512 is the thickness of the pressure relief part 251. The distance from the bottom surface of the stage of score groove 252 nearest to the second surface 2512 to the second surface 2512 is the thickness of the portion between the bottom surface of the stage of score groove 252 nearest to the second surface 2512 and the second surface 2512, which thickness is also the residual thickness of the pressure relief part 251 in the region where the stage of score groove 252 nearest to the second surface 2512 is arranged. the stage of score groove 252 nearest to the second surface 2512 is also one stage of score groove 252 farthest from the first surface 2511. In an embodiment where the pressure relief part 251 is arranged with only two stages of first-stage score grooves 252a, one stage of first-stage score groove 252a far from the first surface 2511 is one stage of score groove 252 nearest to the second surface 2512. In an embodiment where the pressure relief part 251 is arranged with only one stage of second-stage score groove 252b and one stage of first-stage score groove 252a, the first-stage score groove 252a is the score groove 252 nearest to the second surface 2512. As shown in FIG. 17, in an embodiment where the pressure relief part 251 is arranged with only one stage of second-stage score groove 252b and two stages of first-stage score grooves 252a, one stage of first-stage score groove 252a far from the second-stage score groove 252b is one stage of score groove 252 nearest to the second surface 2512.

The ratio of the distance from the bottom surface of the stage of score groove 252 nearest to the second surface 2512 to the second surface 2512 to the distance from the first surface 2511 to the second surface 2512 is less than 0.2, so that the residual thickness of the pressure relief part 251 in the region where the stage of score groove 252 nearest to the second surface 2512 is arranged accounts for a small proportion of the total thickness of the pressure relief part 251, so that the portion between the bottom surface of the stage of score groove 252 nearest to the second surface 2512 and the second surface 2512 can break normally to realize pressure relief.

In some embodiments, the distance from the bottom surface of the stage of score groove 252 nearest to the second surface 2512 to the second surface 2512 is $H_1$, which satisfies the following condition: $H_1 < 0.5$ mm.

$H_1$ may be any value less than 0.5 mm, for example, 0.1 mm, 0.2 mm, 0.3 mm, 0.4 mm, etc.

In this embodiment, the distance from the bottom surface of the stage of score groove 252 nearest to the second surface 2512 to the second surface 2512 is less than 0.5 mm, so that the pressure relief part 251 has a small residual thickness in the region where the stage of score groove 252 nearest to the second surface 2512 is arranged and is thus easy to break for pressure relief.

In some embodiments, a depth of the stage of score groove 252 arranged on the first surface 2511 is $H_2$, which satisfies the following condition: $H_2 < 1$ mm.

$H_2$ may be any value less than 1 mm, for example, 0.1 mm, 0.2 mm, 0.3 mm, 0.4 mm, 0.5 mm, 0.6 mm, 0.7 mm, 0.8 mm, 0.9 mm, etc.

The depth of the stage of score groove 252 that is arranged on the first surface 2511 is the distance between the bottom surface of the score groove 252 arranged on the first surface 2511 and the first surface 2511. As shown in FIG. 17, taking the pressure relief part 251 being arranged with only one stage of second-stage score groove 252b and two stages of first-stage score grooves 252a as an example, the second-stage score groove 252b is the score groove 252 arranged on the first surface 2511.

In this embodiment, the depth of the stage of score groove 252 arranged on the first surface 2511 is less than 1 mm, which allows the depth of the outermost stage of score groove 252 of the pressure relief part 251 to be small, reducing the forming force applied to the pressure relief part 251 at that stage of score groove 252 during the forming process and reducing the risk of cracks generated on the pressure relief part 251.

In some embodiments, a depth of each stage of score groove 252 between the stage of score groove 252 nearest to the second surface 2512 and the stage of score groove 252 arranged on the first surface 2511 is $H_3$, which satisfies the following condition: $H_{3 < 1.5}$ mm.

$H_3$ may be any value less than 1.5 mm, for example, 0.2 mm, 0.5 mm, 0.8 mm, 1 mm, 1.2 mm, 1.4 mm, etc.

It can be understood that the pressure relief part 251 is arranged with at least three stages of score grooves 252.

In this embodiment, the depth of each stage of score groove 252 between the stage of score groove 252 nearest to the second surface 2512 and the stage of score groove 252 arranged on the first surface 2511 is less than 1.5 mm, so that the depth of each stage of score groove 252 on the pressure relief part 251 other than the stage of score groove 252 nearest to the second surface 2512 and the stage of score groove 252 arranged on the first surface 2511 is small, thus reducing the forming force applied to the pressure relief part 251 during the forming process and reducing the risk of cracks generated on the pressure relief part 251.

In some embodiments, only one stage of score groove 252 is arranged between the stage of score groove 252 nearest to the second surface 2512 and the stage of score groove 252 arranged on the first surface 2511.

As an example, as shown in FIG. 17, taking the pressure relief part 251 being arranged with only one stage of second-stage score groove 252b and two stages of first-stage score grooves 252a as an example, one stage of first-stage score groove 252a far from the second-stage score groove 252b is the stage of score groove 252 nearest to the second surface 2512, the second-stage score groove 252b is the stage of score groove 252 arranged on the first surface 2511, and the other stage of first-stage score groove 252a is the stage of score groove 252 between the stage of score groove 252 nearest to the second surface 2512 and the stage of score groove 252 arranged on the first surface 2511.

In this embodiment, three stages of score grooves 252 are arranged on the pressure relief part 251, so that the structure is simple, which can reduce the forming depth of each stage of score groove 252 and reduce the risk of cracks generated on the pressure relief part 251.

In some embodiments, with continued reference to FIGS. 4, 6, 10, and 13, the pressure relief apparatus 25 has an accommodating space formed inside, and the pressure relief apparatus has multiple wall portions defining the accommodating space, the accommodating space being used to house an electrode assembly 22, and at least one of the multiple wall portions being provided with the pressure relief part 251.

Among the multiple wall portions of the pressure relief apparatus 25, one wall portion may be the pressure relief part 251, or, alternatively, multiple wall portions may be the pressure relief part 251. If multiple wall portions are the pressure relief part 251, the pressure relief apparatus 25 has multiple pressure relief parts 251 correspondingly. The first surface 2511 of the pressure relief part 251 may be the outer surface of the wall portion, or the inner surface of the wall portion. The outer surface of the wall portion is the surface of the wall portion facing away from the electrode assembly 22, and the inner surface of the wall portion is the surface of the wall portion facing the electrode assembly 22. In this embodiment, the pressure relief apparatus 25 serves as the case 21 of the battery cell 20.

In this embodiment, the pressure relief apparatus 25 has both an accommodating function to accommodate the electrode assembly 22 and a pressure relief function.

In some embodiments, the multiple wall portions comprise a peripheral wall 254 and a bottom wall 255, the peripheral wall 254 being arranged around the edge of the bottom wall 255, the peripheral wall 254 and the bottom wall 255 jointly defining the accommodating space, an opening being formed at one end of the peripheral wall 254 opposite to the bottom wall 255, and the bottom wall 255 being provided with the pressure relief part 251.

The peripheral wall 254 is arranged around the edge of the bottom wall 255 so that the pressure relief apparatus 25 can have an opening formed at one end opposite to the bottom wall 255, and the end cover 23 is used to cover the opening.

In embodiments where the pressure relief apparatus 25 is cylindrical, the pressure relief apparatus 25 may have two wall portions, among which one wall portion is the bottom wall 255 and the other wall portion is the cylindrical peripheral wall 254. As shown in FIGS. 4, 6, 10 and 13, in embodiments where the pressure relief apparatus 25 is a rectangular solid, the pressure relief apparatus 25 may have five wall portions, namely one bottom wall 255 and four side walls, with the four side walls being connected end to end in sequence to form the peripheral wall 254.

In this embodiment, the bottom wall 255 of the pressure relief apparatus 25 has a pressure relief function, thus facilitating relief of the pressure inside the accommodating space.

In some embodiments, the peripheral wall 254 and the bottom wall 255 are of an integrally formed structure.

The peripheral wall 254 and the bottom wall 255 may be formed together by means of integral forming, for example, stamping, casting forming, etc.

In this embodiment, since the bottom wall 255 is formed with the pressure relief part 251 and the peripheral wall 254 and the bottom wall 255 are of an integrally formed structure, the peripheral wall 254 as well as the bottom wall 255 that has the pressure relief function have good firmness, and this integral design can simplify the forming process and reduce production costs.

In some embodiments, the first surface 2511 is an outer surface of the bottom wall 255. The multi-stage score grooves 252 are sequentially arranged from the outer surface of the bottom wall 255 to the inner surface of the bottom wall 255, and the score grooves 252 can be machined and formed on the outer side of the bottom wall 255 to facilitate the machining of the score grooves 252 on the bottom wall 255.

Figure 18:
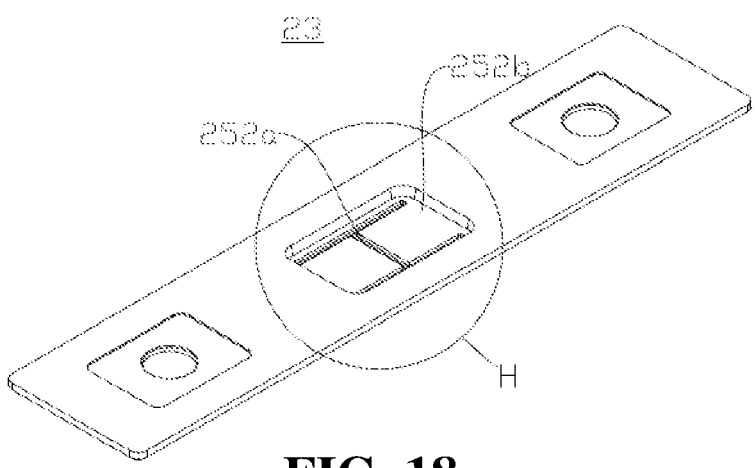
FIG. 18 is an axonometric view of a pressure relief apparatus provided by other embodiments of the present application.
Figure 19:
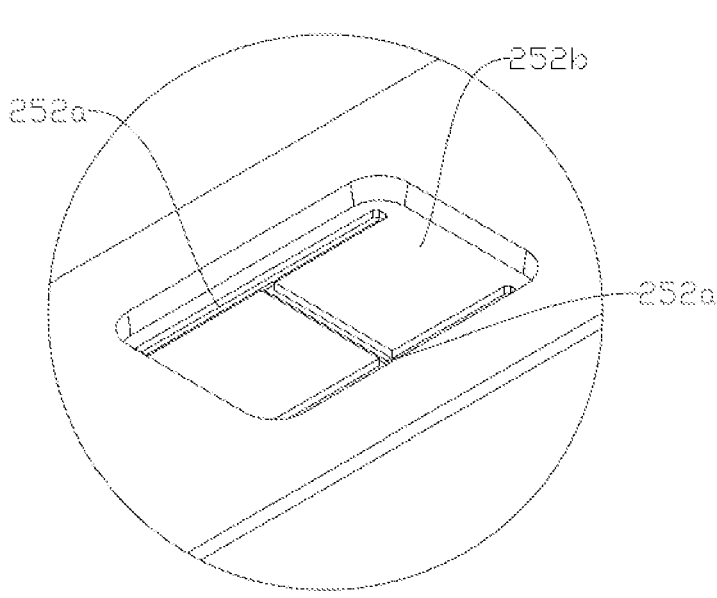
FIG. 19 is a partial enlarged view of the pressure relief apparatus shown in FIG. 18 at H.

In some embodiments, reference is made to FIGS. 18 and 19. FIG. 18 is an axonometric view of a pressure relief apparatus 25 provided by other embodiments of the present application; and FIG. 19 is a partial enlarged view of the pressure relief apparatus 25 shown in FIG. 18 at H. The pressure relief part 251 is an end cover 23, which end cover 23 is used to cover the opening of the case 21.

The first surface 2511 may be the outer surface of the end cover 23 and the second surface 2512 may be the inner surface of the end cover 23; or, alternatively, the first surface 2511 may be the inner surface of the end cover 23 and the second surface 2512 may be the outer surface of the end cover 23. The outer surface of the end cover 23 is the surface of the end cover 23 facing away from the case 21, and the inner surface of the end cover 23 is the surface of the end cover 23 facing the case 21.

As an example, in FIG. 18, the end cover 23 is arranged with three stages of score grooves 252, namely, one stage of second-stage score groove 252*b* and two stages of first-stage score groove 252*a*, respectively.

In this embodiment, the end cover 23 has a pressure relief function, and by providing score grooves 252 on the end cover 23, the pressure relief structure is formed, which pressure relief structure has better stability and good long-term reliability.

In some embodiments, as shown in FIG. 18, the first surface 2511 is a surface of the end cover 23 facing away from the case 21. It can be understood that the first surface 2511 is the outer surface of the end cover 23, and one stage of score groove 252 located at the outermost side is arranged on the outer surface of the end cover 23.

An embodiment of the present application provides a battery cell 20 comprising the pressure relief apparatus 25 provided in any of the above embodiments.

In a third aspect, an embodiment of the present application provides a battery 100 comprising the battery cell 20 provided in any of the above embodiments.

In a fourth aspect, an embodiment of the present application provides an electrical device comprising the battery 100 provided in any one of the above embodiments.

The electrical device may be any of the aforementioned device that use the battery 100.

Please refer to FIGS. 13 to 16, an embodiment of the present application further provides a case 21, wherein the case 21 is of a rectangular solid structure, and the case 21 comprises multiple wall portions, the multiple wall portions jointly defining an accommodating space for accommodating the electrode assembly 22, the case 21 having an opening, a wall portion of the case 21 opposite to the opening being arranged with three stages of score grooves 252, the three stages of score grooves 252 being one stage of second-stage score groove 252*b* and two stages of first-stage score grooves 252*a*, rectangular solid structure, with the second-stage score groove 252*b* being arranged on the outer surface of the wall portion. The case 21 of this structure has both the pressure relief function and the accommodating function, and the three-stage score grooves 252 structure can reduce the forming force on the case 21 when forming each stage of score groove 252, thus reducing the risk of cracking of the case 21 and improving the long-term reliability of the case 21.

It should be noted that in case of no conflicts, the features of the embodiments in the present application may be combined with each other.

The above embodiments are only intended to illustrate the technical solutions of the present application, and are not intended to limit the present application, and for those skilled in the art, the present application may be subjected to various changes and variations. Any modification, equivalent substitution, improvement, etc., made within the spirit and principles of the present application shall be included in the protection scope of the present application.

What is claimed is:

1. A pressure relief apparatus, comprising:
a pressure relief part having a first surface and a second surface opposite to each other in a thickness direction of the pressure relief part; and
a plurality of stages of score grooves sequentially arranged on the pressure relief part in a direction from the first surface to the second surface, wherein of two adjacent stages of score grooves in the thickness direction, one stage of score groove that is farther from the first surface is arranged on a bottom surface of another stage of score groove that is closer to the first surface;
wherein:
the plurality of stages of score grooves comprise a first-stage score groove, the first-stage score groove comprising a first groove segment, a second groove segment, a third groove segment, and a fourth groove segment,
the first groove segment and the second groove segment being oppositely arranged,
the first groove segment and the second groove segment both intersecting with the third groove segment,
the fourth groove segment being a rectilinear groove located between the first groove segment and the second groove segment, intersecting with the third groove segment, being parallel to the first groove segment and the second groove segment, and being perpendicular to the third groove segment;
the pressure relief part comprises an opening region, the first groove segment, the second groove segment, and the third groove segment being arranged along an edge of the opening region, and the opening region being configured to be openable with the first groove segment, the second groove segment, and the third groove segment as boundaries;
the second surface is provided with a notch groove only located within the opening region, and the notch groove is at a distance from the third groove segment in a direction of extension of the first groove segment; and the notch groove is at a distance from both the first groove segment and the second groove segment in a direction of extension of the third groove segment; and the notch groove extends in the direction of extension of the third groove segment, and the notch groove is parallel to the third groove segment.

2. The pressure relief apparatus according to claim 1, wherein the first groove segment, the second groove segment, and the third groove segment form two opening regions, and each of the opening regions is provided with one notch groove.

3. The pressure relief apparatus according to claim 1, wherein a part of the pressure relief part located in the opening region can be turned over with a part of the pressure relief part located in the notch groove as an axis.

4. The pressure relief apparatus according to claim 1, wherein in the direction of extension of the third groove segment, a distance from the position of intersection of the fourth groove segment with the third groove segment to the first groove segment is equal to a distance from the position of intersection of the fourth groove segment with the third groove segment to the second groove segment.

5. The pressure relief apparatus according to claim 1, wherein the first groove segment, the second groove segment, and the third groove segment form at least one opening region.

6. The pressure relief apparatus according to claim 1, wherein the first groove segment, the second groove segment, and the third groove segment form two opening regions that are located on two sides of the third groove segment respectively.

7. The pressure relief apparatus according to claim 1, wherein the plurality of stages of score grooves comprise one stage of the first-stage score groove.

8. The pressure relief apparatus according claim 1, wherein the first-stage score groove comprise multiple stages of the first-stage score grooves sequentially arranged in the direction from the first surface to the second surface.

9. The pressure relief apparatus according claim 1, wherein the plurality of stages of score grooves further comprise at least one stage of a second-stage score groove, the at least one stage of the second-stage score groove and the first-stage score groove being sequentially arranged in the direction from the first surface to the second surface,
wherein the opening region is formed on a groove bottom wall of one stage of the second-stage score groove that is farthest from the first surface.

10. The pressure relief apparatus according to claim 9, wherein the plurality of stages of score grooves comprise one stage of the second-stage score groove, the second-stage score groove being arranged on the first surface.

11. The pressure relief apparatus according claim 9, wherein the at least one stage of the second-stage score groove comprise multiple stages of second-stage score grooves, the multiple stages of the second-stage score grooves being sequentially arranged in the direction from the first surface to the second surface, with an outermost stage of the multiple stages of the second-stage score grooves being arranged on the first surface.

12. The pressure relief apparatus according claim 1, wherein each stage of the plurality of stages of score grooves comprises at least one groove segment, and among two adjacent groove segments in the thickness direction, a maximum width of the groove segment furthest far from the first surface is less than a minimum width of the groove segment nearest to the first surface.

13. The pressure relief apparatus according to claim 1, wherein a distance $H_0$ between the first surface and the second surface and a distance $H_1$ between the second surface and a bottom surface of one stage of score groove that is nearest to the second surface satisfy the following condition: $H_1/H_0 < 0.2$.

14. The pressure relief apparatus according to claim 1, wherein a distance $H_1$ between the second surface and a bottom surface of one stage of score groove that is nearest to the second surface satisfies the following condition: $H_1 < 0.5$ mm.

15. The pressure relief apparatus according to claim 1, wherein a depth $H_2$ of the stage of score groove that is arranged on the first surface satisfies the following condition: $H_2 < 1$ mm.

16. The pressure relief apparatus according to claim 1, wherein a depth $H_3$ of each stage of score groove between the stage of score groove nearest to the second surface and the stage of score groove arranged on the first surface satisfies the following condition: $H_3 < 1.5$ mm.

17. The pressure relief apparatus according to claim 1, wherein:
the notch groove is located between the third groove segment and an end of the first groove segment extending in a direction perpendicular to the third groove segment and an end of the second groove segment extending in a direction perpendicular to the third groove segment.

18. A pressure relief apparatus, comprising:
a pressure relief part having a first surface and a second surface opposite to each other in a thickness direction of the pressure relief part; and
a plurality of stages of score grooves sequentially arranged on the pressure relief part in a direction from the first surface to the second surface, wherein of two adjacent stages of score grooves in the thickness direction, one stage of score groove that is farther from the first surface is arranged on a bottom surface of another stage of score groove that is closer to the first surface;
wherein:
the plurality of stages of score grooves comprise a first-stage score groove, the first-stage score groove comprising a first groove segment, a second groove segment, a third groove segment, and a fourth groove segment,
the first groove segment and the second groove segment being oppositely arranged,
the first groove segment and the second groove segment both intersecting with the third groove segment,
the fourth groove segment being a rectilinear groove located between the first groove segment and the second groove segment, intersecting with the third groove segment, being parallel to the first groove segment and the second groove segment, and being perpendicular to the third groove segment;
the pressure relief part comprises an opening region, the first groove segment, the second groove segment, and the third groove segment being arranged along an edge of
the opening region, and the opening region being configured to be openable with the first groove segment, the second groove segment, and the third groove segment as boundaries; the second surface is provided with a notch groove only located within the opening region, and the notch groove is at a distance from the third groove segment in a direction of extension of the first groove segment; and
the notch groove is at a distance from both the first groove segment section and the second groove segment section in a direction of extension of the third groove segment; and
the notch groove is located between the third groove segment and an end of the first groove segment extending in a direction perpendicular to the third groove segment and an end of the second groove segment extending in the direction perpendicular to the third groove segment.

19. A pressure relief apparatus, comprising:

a pressure relief part having a first surface and a second surface opposite to each other in a thickness direction of the pressure relief part; and a plurality of stages of score grooves sequentially arranged on the pressure relief part in a direction from the first surface to the second surface, wherein of two adjacent stages of score grooves in the thickness direction, one stage of score groove that is farther from the first surface is arranged on a bottom surface of another stage of score groove that is closer to the first surface; wherein:

the plurality of stages of score grooves comprise a first-stage score groove, the first-stage score groove comprising a first groove segment, a second groove segment, a third groove segment, and a fourth groove segment, the first groove segment and the second groove segment being oppositely arranged, the first groove segment and the second groove segment both intersecting with the third groove segment, and the fourth groove segment being located between the first groove segment and the second groove segment, and intersecting with the third groove segment;

the pressure relief part comprises an opening region, the first groove segment, the second groove segment, and the third groove segment being arranged along an edge of the opening region, and the opening region being configured to be openable with the first groove segment, the second groove segment, and the third groove segment as boundaries;

the second surface is provided with only one notch groove only located within the opening region, and the only one notch groove is at a distance from the third groove segment in a direction of extension of the first groove segment; and the only one notch groove is at a distance from both the first groove segment and the second groove segment in a direction of extension of the third groove segment; and the only one notch groove is a rectilinear groove extending in the direction of extension of the third groove segment, and the only one notch groove is parallel to the third groove segment and perpendicular to the fourth groove segment.

20. The pressure relief apparatus according to claim 19, wherein the fourth groove segment is parallel to the first groove segment and the second groove segment, and is perpendicular to the third groove segment.

\* \* \* \* \*